United States Patent
Park et al.

(10) Patent No.: US 11,622,093 B1
(45) Date of Patent: Apr. 4, 2023

(54) PIXEL ARRAY FOR REDUCING IMAGE INFORMATION LOSS AND IMAGE SENSOR INCLUDING THE SAME

(71) Applicant: SAMSUNG ELECTRONICS CO., LTD., Suwon-si (KR)

(72) Inventors: Soyoun Park, Seoul (KR); Byungwook Jung, Gunpo-si (KR)

(73) Assignee: SAMSUNG ELECTRONICS CO., LTD., Suwon (KR)

( * ) Notice: Subject to any disclaimer, the term of this patent is extended or adjusted under 35 U.S.C. 154(b) by 0 days.

(21) Appl. No.: 17/735,722

(22) Filed: May 3, 2022

(30) Foreign Application Priority Data

Oct. 1, 2021 (KR) .......................... 10-2021-0131170

(51) Int. Cl.
*H04N 9/04* (2006.01)
*H04N 5/369* (2011.01)

(52) U.S. Cl.
CPC ........... *H04N 9/0451* (2018.08); *H04N 5/369* (2013.01); *H04N 9/0455* (2018.08); *H04N 2209/042* (2013.01)

(58) Field of Classification Search
CPC .... H04N 9/0451; H04N 5/369; H04N 9/0455; H04N 2209/042
See application file for complete search history.

(56) References Cited

U.S. PATENT DOCUMENTS

| | | | |
|---|---|---|---|
| 5,852,468 A * | 12/1998 | Okada | H04N 9/646 348/E9.042 |
| 9,184,195 B2 | 11/2015 | Hayashi et al. | |
| 9,210,386 B2 * | 12/2015 | Rissa | H04N 5/335 |
| 9,451,221 B2 | 9/2016 | Hirota | |
| 10,609,348 B2 | 3/2020 | Agranov et al. | |
| 10,855,959 B2 | 12/2020 | Cha et al. | |
| 10,999,543 B2 | 5/2021 | Kageyama et al. | |
| 11,470,270 B1 * | 10/2022 | Powell | H04N 9/04515 |
| 2009/0200451 A1 * | 8/2009 | Conners | H04N 5/37457 250/226 |
| 2014/0160326 A1 * | 6/2014 | Black | H04N 9/04557 348/262 |
| 2014/0307135 A1 | 10/2014 | Tanaka et al. | |
| 2018/0146148 A1 * | 5/2018 | Kaneko | H04N 5/37457 |
| 2018/0357750 A1 | 12/2018 | Chen et al. | |
| 2021/0243413 A1 | 8/2021 | Park et al. | |
| 2021/0392303 A1 | 12/2021 | Park et al. | |

FOREIGN PATENT DOCUMENTS

JP 6070301 B2 2/2017

* cited by examiner

*Primary Examiner* — Chiawei Chen
(74) *Attorney, Agent, or Firm* — Sughrue Mion, PLLC

(57) ABSTRACT

A pixel array is provided. The pixel array includes: a plurality of color filter array (CFA) cells. Each of the plurality of CFA cells includes a plurality of CFA blocks provided along a width direction and a length direction. Each of the plurality of CFA blocks includes a first sub block and a second sub block. The first sub block includes m*n pixels having an interpolation distance of 0 during conversion into a Bayer pattern. The second sub block includes at least one pixel having the interpolation distance of 0 during conversion into the Bayer pattern among pixels outside the first sub block, where "m" and "n" are integers of at least 2. The m*n pixels of the first sub block include pixels corresponding to a first color, a second color and a third color. Respective second sub blocks of the plurality of CFA blocks form an inter-sub block in each of the plurality of CFA cells.

20 Claims, 25 Drawing Sheets

FIG. 7

| 0.00 | 2.00 | 0.00 | 2.00 | 0.00 | 1.21 | 2.30 | 0.00 | 2.31 | 0.00 | 2.13 | 0.00 |
|------|------|------|------|------|------|------|------|------|------|------|------|
| 2.00 | 0.00 | 0.00 | 0.00 | 2.00 | 0.00 | 2.12 | 2.58 | 0.00 | 0.00 | 0.00 | 2.13 |
| 0.00 | 0.00 | 0.00 | 0.00 | 0.00 | 1.50 | 2.59 | 0.00 | 0.00 | 0.00 | 0.00 | 0.00 |
| 2.00 | 0.00 | 0.00 | 0.00 | 2.00 | 0.00 | 2.00 | 2.49 | 0.00 | 0.00 | 0.00 | 2.31 |
| 0.00 | 2.00 | 0.00 | 2.00 | 0.00 | 0.00 | 0.00 | 0.00 | 2.49 | 0.00 | 2.40 | 0.00 |
| 1.21 | 0.00 | 1.21 | 0.00 | 0.00 | 0.00 | 0.00 | 0.00 | 2.00 | 2.59 | 2.12 | 2.30 |
| 2.30 | 2.12 | 2.59 | 2.00 | 0.00 | 0.00 | 0.00 | 0.00 | 0.00 | 1.21 | 0.00 | 1.21 |
| 0.00 | 2.40 | 0.00 | 2.49 | 0.00 | 0.00 | 0.00 | 0.00 | 2.00 | 0.00 | 2.00 | 0.00 |
| 2.31 | 0.00 | 0.00 | 0.00 | 2.49 | 2.00 | 0.00 | 2.00 | 0.00 | 0.00 | 0.00 | 2.00 |
| 0.00 | 0.00 | 0.00 | 0.00 | 0.00 | 2.59 | 1.21 | 0.00 | 0.00 | 0.00 | 0.00 | 0.00 |
| 2.13 | 0.00 | 0.00 | 0.00 | 2.40 | 2.12 | 0.00 | 2.00 | 0.00 | 0.00 | 0.00 | 2.00 |
| 0.00 | 2.13 | 0.00 | 2.31 | 0.00 | 2.30 | 1.21 | 0.00 | 2.00 | 0.00 | 2.00 | 0.00 |

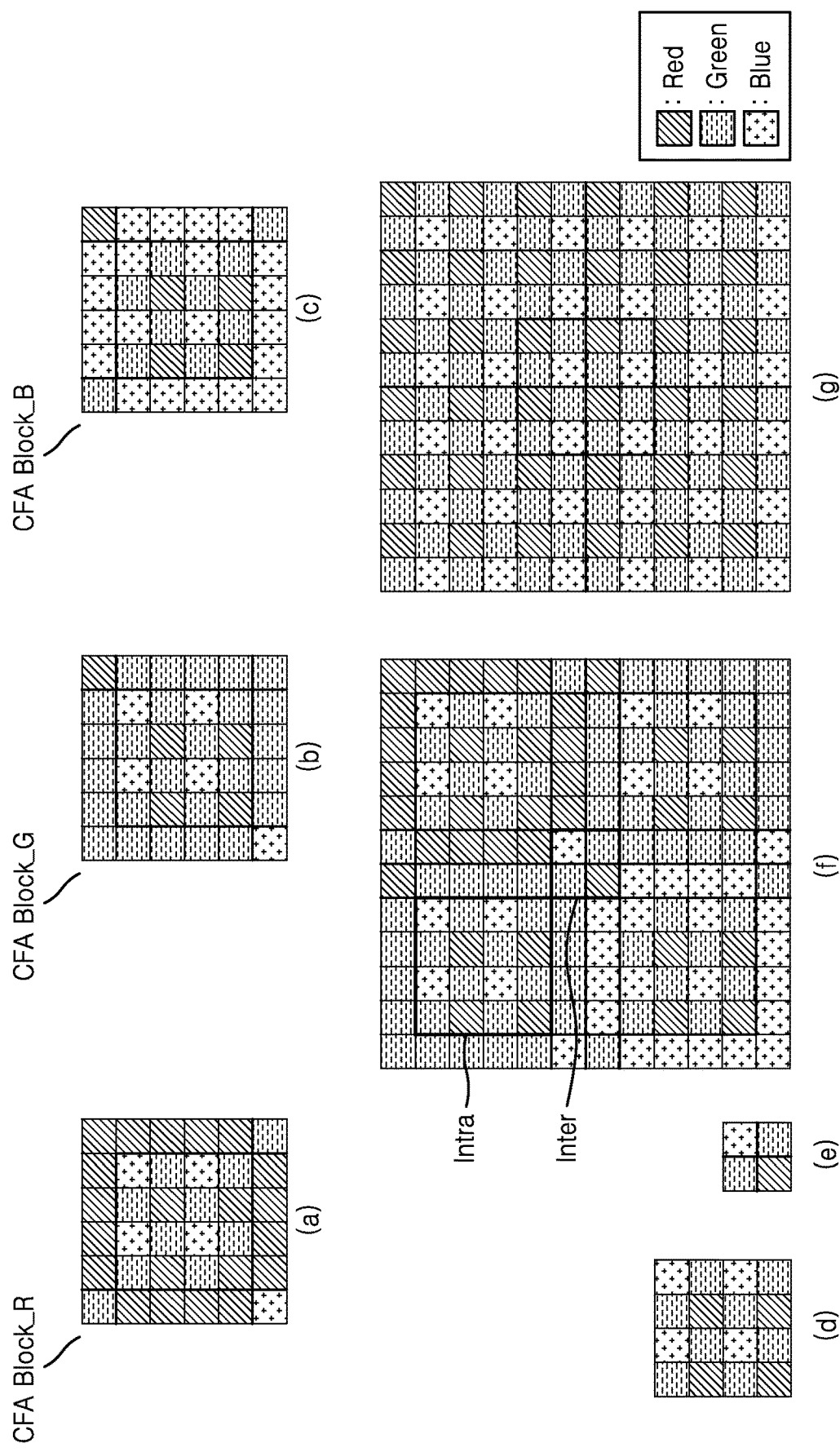

FIG. 13
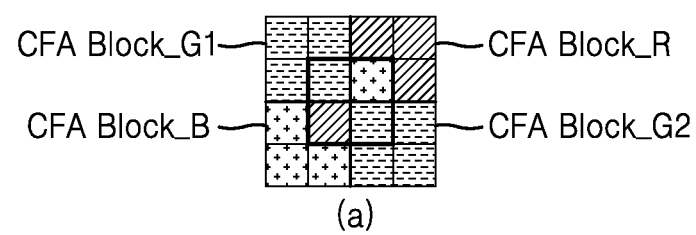
(a)
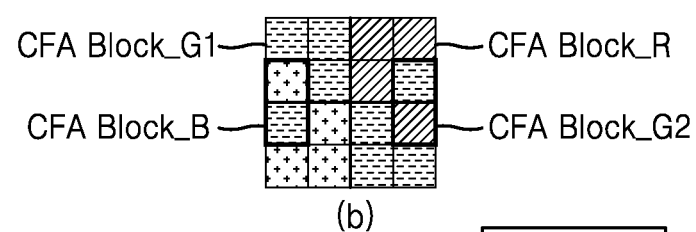
(b)
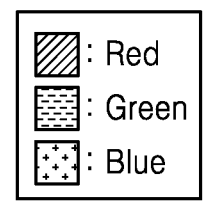

FIG. 14
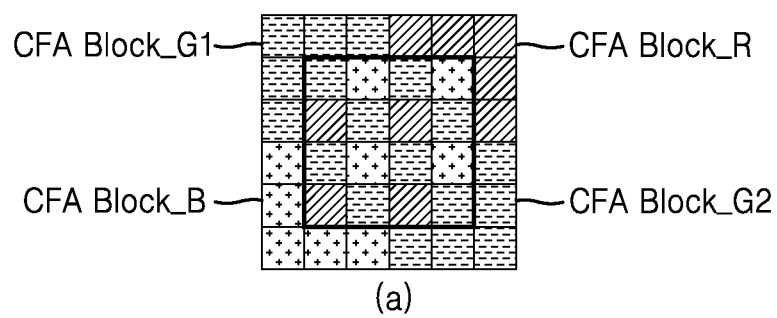
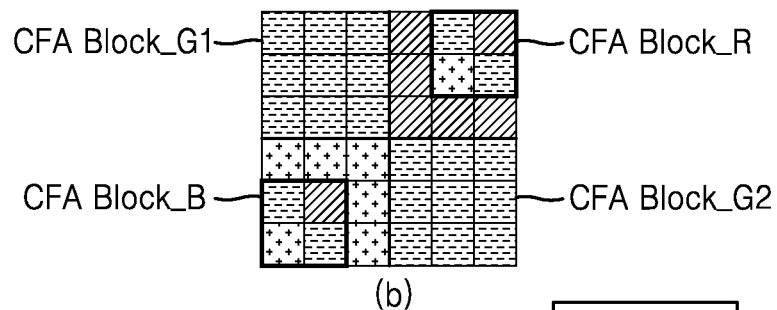
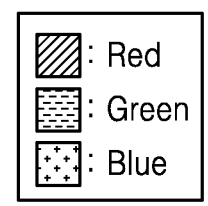

FIG. 15
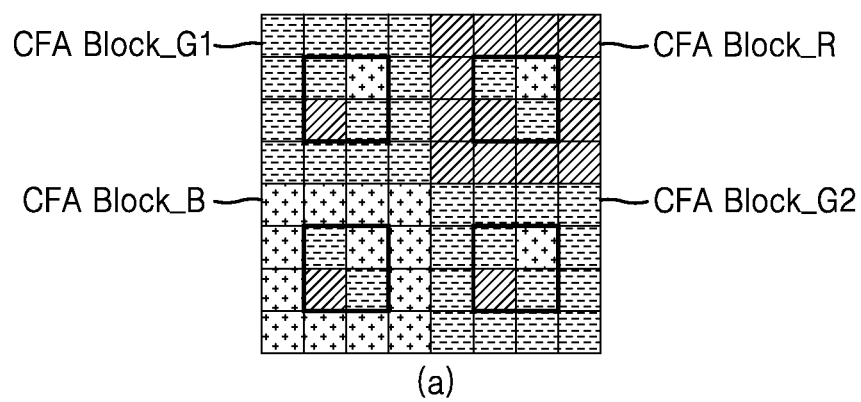
(a)
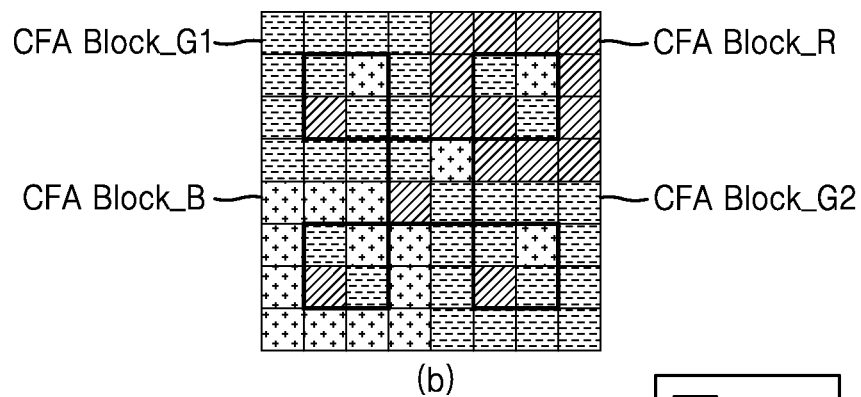
(b)
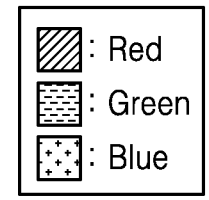

FIG. 16
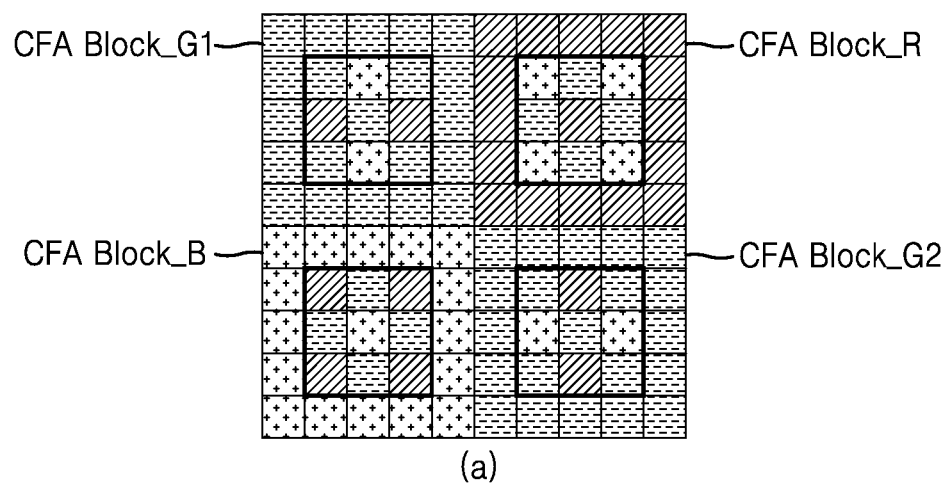
(a)
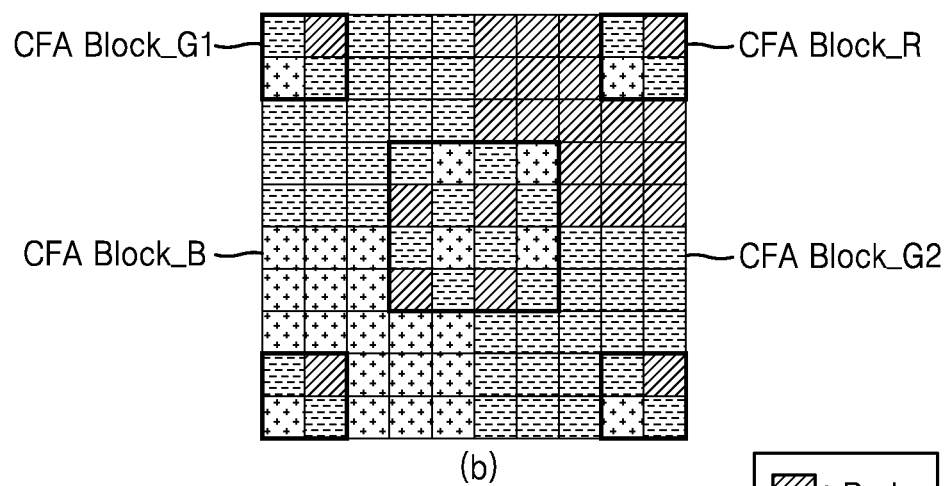
(b)
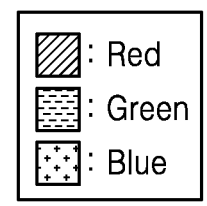

PIXEL ARRAY FOR REDUCING IMAGE INFORMATION LOSS AND IMAGE SENSOR INCLUDING THE SAME

CROSS-REFERENCE TO RELATED APPLICATION

This application claims priority to Korean Patent Application No. 10-2021-0131170, filed on Oct. 1, 2021, in the Korean Intellectual Property Office, the disclosure of which is incorporated by reference herein in its entirety.

BACKGROUND

The present disclosure relates to an image sensor, and more particularly, to a pixel array for reducing image information loss and an image sensor including the same.

Image sensors capture two-dimensional (2D) or three-dimensional (3D) images of an object. Image sensors generate an image of an object using a photoelectric conversion element, which reacts to the intensity of light reflected from the object. With the recent development of complementary metal-oxide semiconductor (CMOS) technology, a CMOS image sensor (CIS) using CMOS has been widely used.

Image sensors may include a pixel array. When image sensors have a higher pixel count, the pixel array may include more color pixels. To convert a raw image output from an image sensor into a certain pattern such as an RGB image, a remosaic process based on interpolation and/or extrapolation may be performed. When a distance to a neighboring color pixel, which may be referred to in this process, increases, loss of image information may occur.

SUMMARY

One or more example embodiments provide a pixel array for preventing image loss from increasing during processing of an image captured by an image sensor.

According to an aspect of an example embodiment, a pixel array of an image sensor includes: a plurality of color filter array (CFA) cells, each of the plurality of CFA cells including a plurality of CFA blocks provided along a width direction and a length direction. Each of the plurality of CFA blocks includes a first sub block and a second sub block. The first sub block includes m*n pixels having an interpolation distance of 0 during conversion into a Bayer pattern. The second sub block includes at least one pixel having the interpolation distance of 0 during conversion into the Bayer pattern among pixels outside the first sub block, where "m" and "n" are integers of at least 2. The m*n pixels of the first sub block includes pixels corresponding to a first color, a second color and a third color. Respective second sub blocks of the plurality of CFA blocks form an inter-sub block in each of the plurality of CFA cells.

According to an aspect of an example embodiment, a pixel array of an image sensor includes: a plurality of CFA cells, each of the plurality of CFA cells including 2*2 CFA blocks provided along a width direction and a length direction. Each of the 2*2 CFA blocks includes an intra-sub block and an outer region, the intra-sub block is provided at a central region of each of the 2*2 CFA blocks and includes a first plurality of pixels having an interpolation distance of 0 during a conversion into a Bayer pattern, and the outer region is provided outside of the intra-sub block and includes a second plurality of pixels. The 2*2 CFA blocks include a red CFA block, a first green CFA block, a second green CFA block, and a blue CFA block, the intra-sub block of each of the 2*2 CFA blocks includes a red pixel, a blue pixel, and a green pixel, in a color pattern corresponding to the Bayer pattern. Red pixels and a sub block are arranged in the outer region of the red CFA block, the red pixels sensing a red color, and the sub block including any one or any combination of the green pixel and the blue pixel, each having the interpolation distance of 0.

According to an aspect of an example embodiment, an image sensor includes: a pixel array including a plurality of color filter array (CFA) cells, each including a plurality of CFA blocks provided along a width direction and a length direction. Each of the plurality of CFA blocks includes a first sub block and a second sub block. The first sub block includes m*n pixels having an interpolation distance of 0 during conversion into a Bayer pattern. The second sub block includes at least one pixel having the interpolation distance of 0 during the conversion into the Bayer pattern among pixels outside the first sub block, where "m" and "n" are integers of at least 2. The image sensor also includes a read circuit configured to read pixel values from pixels of the pixel array. The m*n pixels of the first sub block include pixels corresponding to a first color, a second color and a third color, and respective second sub blocks of the plurality of CFA blocks form an inter-sub block in each of the plurality of CFA cells.

BRIEF DESCRIPTION OF THE DRAWINGS

The above and other aspects will be more apparent from the following description of example embodiments taken in conjunction with the accompanying drawings in which:

FIG. 7 is a diagram showing an example of an interpolation distance of each of color pixels included in a color filter array (CFA) cell of FIG. 5;

FIGS. 10, 11A, 11B and 11C are diagrams showing implementations of a CFA cell according to various example embodiments;

FIGS. 13 to 16 are diagrams showing implementations of CFA cells in various sizes;

DETAILED DESCRIPTION

Hereinafter, example embodiments will be described in detail with reference to the accompanying drawings.

Figure 1:
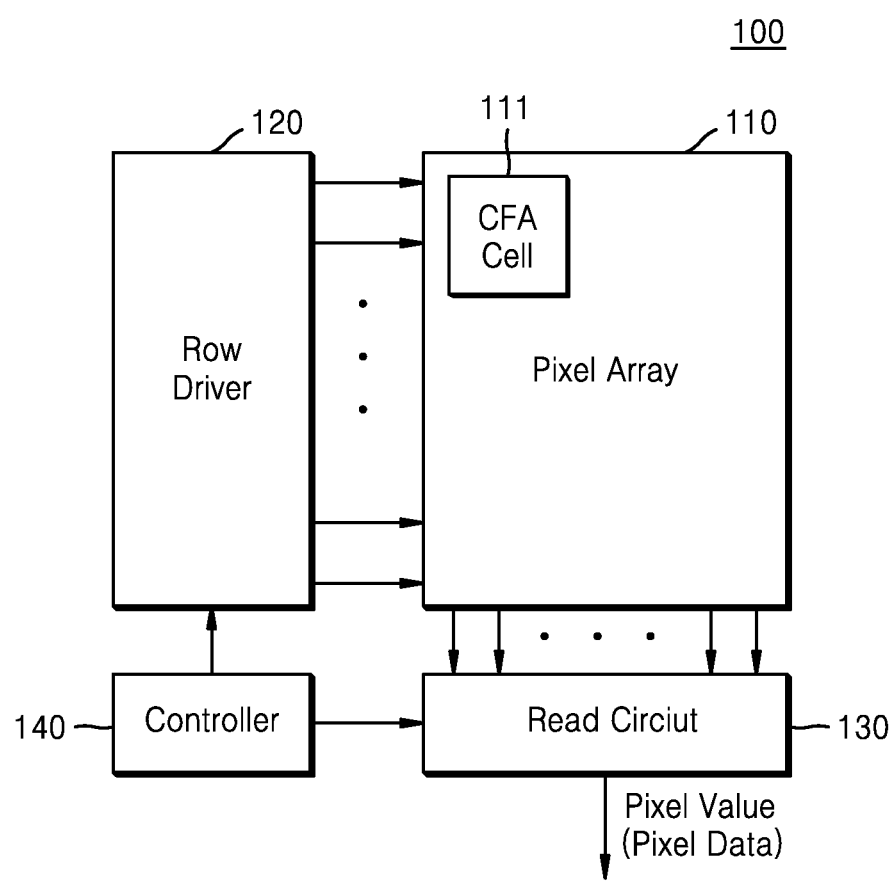
FIG. 1 is a block diagram of an image sensor including a pixel array, according to an example embodiment.

FIG. 1 is a block diagram of an image sensor including a pixel array, according to an example embodiment.

Referring to FIG. 1, an image sensor 100 may include a pixel array 110, a row driver 120, a read circuit 130, and a controller 140. The image sensor 100 may include a complementary metal-oxide semiconductor (CMOS) image sensor (CIS).

The controller 140 may control the row driver 120 and the read circuit 130. The pixel array 110 may include a plurality of pixels (e.g., color pixels). Each of the pixels may include at least one photosensitive element. The photosensitive element may sense light in each pixel and generate an electrical signal according to the intensity of the sensed light. The photosensitive element may include a photodiode, a photogate, a phototransistor, or the like. The pixel array 110 may include color pixels in various patterns, according to example embodiments. Each of the color pixels may generate, as a pixel signal, an electrical signal related to at least one color. Processing such as remosaicing may be performed on pixel signals of the pixel array 110, and a color pattern of the pixel array 110 may be converted by this processing into a certain pattern such as a Bayer pattern.

The pixel array 110 may output an electrical signal, which corresponds to light absorbed by the photosensitive element, to the read circuit 130. The row driver 120 may output a signal, which controls each of the color pixels of the pixel array 110. For example, the row driver 120 may output a signal, which resets a photosensitive element of each color pixel or controls the photosensitive element to output an electrical signal corresponding to photocharge accumulated therein.

The read circuit 130 may receive an electrical signal from the pixel array 110 and output a pixel value (or pixel data). For example, the read circuit 130 may include an analog-to-digital converter (ADC) and output, as pixel data, a digital signal corresponding to an analog signal received from the pixel array 110.

Pixel data of the image sensor 100 may be provided to an image processing unit, and a processing operation such as remosaicing may be performed by the image processing unit based on digital signal processing. According to example embodiments, a processing operation such as remosaicing may be performed by an element (e.g., a processor) of the image sensor 100 or by a separate processing unit outside the image sensor 100.

Hereinafter, an implementation of color pixels of the pixel array 110 will be shown according to example embodiments.

Figure 2:
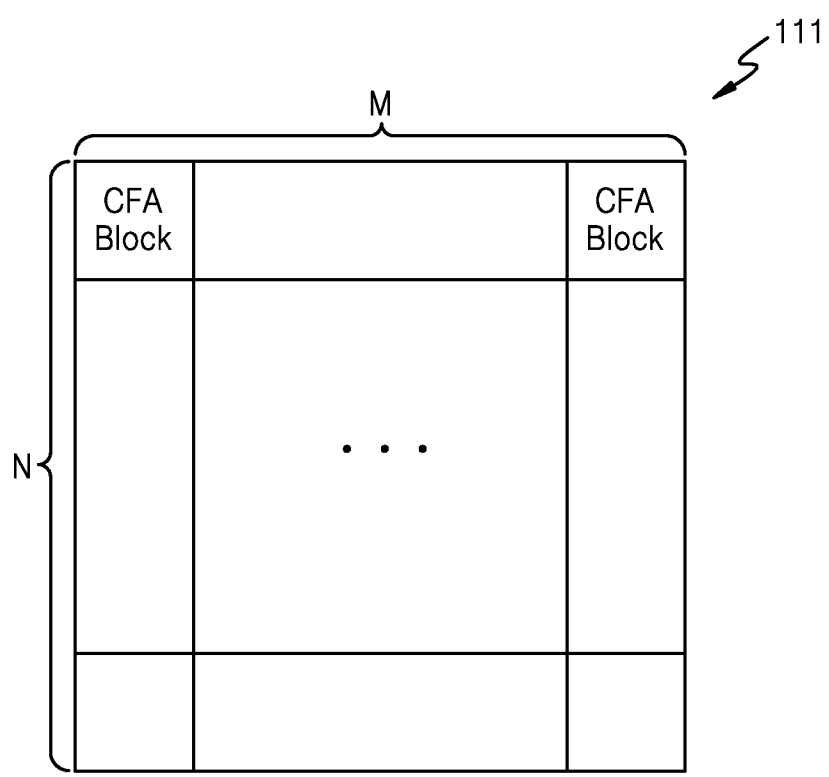
FIGS. 2 to 4 are diagrams of an implementation of a pixel array according to example embodiments.
Figure 3:
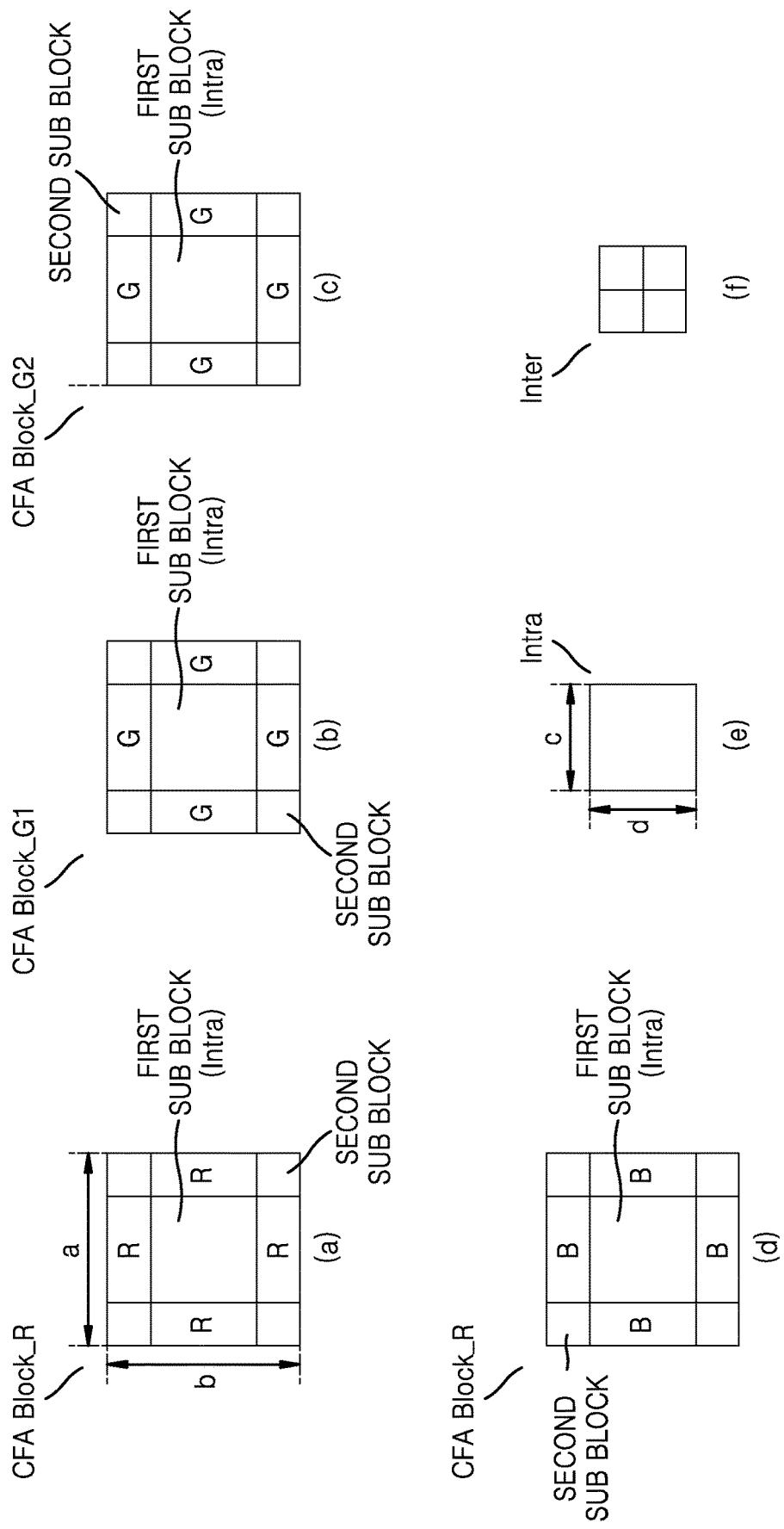
Figure 4:
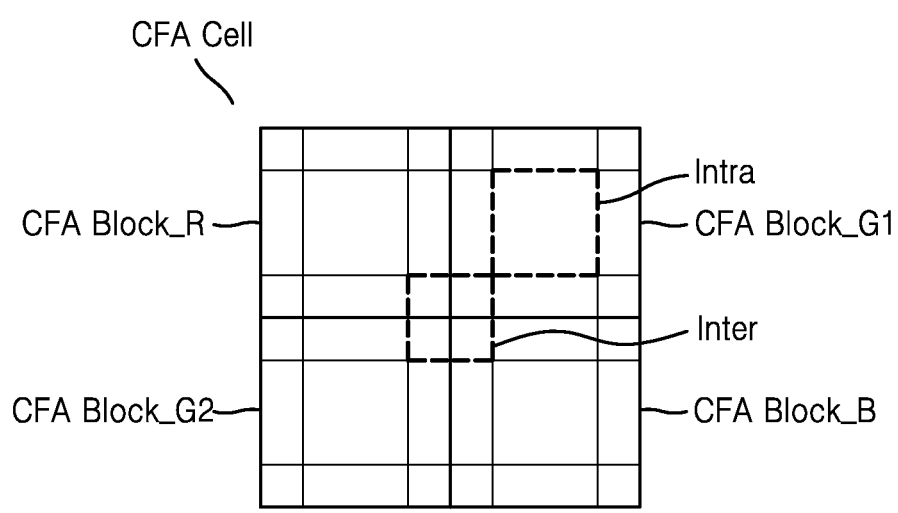

FIGS. 2 to 4 are diagrams of an implementation of a pixel array according to example embodiments.

Referring to FIGS. 1 and 2, the image sensor 100 may include the pixel array 110, and a color filter array (CFA) may be provided in the pixel array 110 to allow a certain color to be sensed by each pixel. In the description below, the terms "color filter", "color pixel", "filter array", and "pixel array" may be variously defined. For example, a CFA may indicate a separate element provided on a pixel array including a photosensitive element or included in a pixel array. In other words, a color pixel may include a corresponding color filter. In the description below, each of a CFA cell, a CFA block, and a sub block may include a color pixel.

The pixel array 110 may include a plurality of CFA cells 111, which are provided in a certain unit. For example, the pixel array 110 may include a plurality of CFA cells 111 in length and width directions. Each of the CFA cells 111 may include pixels (which may be referred to as color pixels) having a certain size.

Each of the CFA cells 111 may include a plurality of CFA blocks and may refer to a minimum structure of the same CFA blocks. FIG. 2 shows an example, in which a CFA cell 111 includes M*N CFA blocks, such that the CFA cell 111 includes M CFA blocks in the width direction and N CFA blocks in the length direction.

At this time, in the case where each CFA block includes the same kind of pixels (or pixels sensing the same color), when a raw image output from an image sensor is converted into an RGB image, a distance between a pixel (e.g., a center pixel) and a neighboring pixel, which may be referred to during image processing such as interpolation or extrapolation, increases, resulting in loss of image information. In particular, the greater the size of a CFA block, the greater a distance between neighboring pixels to be referred to, and accordingly, an image loss rate may also increase.

In example embodiments, the color pixels (or color filters) of the CFA cell 111 and the CFA block of the pixel array 110 may have a pattern that may reduce an image loss rate during image processing. As an implementation, CFA blocks may have various sizes, and accordingly, a CFA cell including a plurality of CFA blocks may have various sizes. A CFA block may sense at least two colors, and may include pixels sensing all colors applied to the pixel array 110. For example, when red, green, and blue colors are sensed by the pixel array 110, a CFA block may include a red color pixel, a blue color pixel, and a green color pixel (hereinafter, referred to as a red pixel, a blue pixel, and a green pixel, respectively).

FIG. 3 illustrates implementations of a CFA block according to an example embodiment, and FIG. 4 illustrates an implementation of a CFA cell based on CFA blocks in FIG. 3. According to example embodiments, a CFA block may be referred to as a red CFA block, a blue CFA block, or a green CFA block according to pixels of the CFA block. For example, when the number of red pixels is the highest in a CFA block, the CFA block may be referred to as a red CFA block.

When a CFA cell includes 2*2 CFA blocks, the CFA cell may include a red CFA block CFA Block_R, first and second green CFA blocks CFA Block_G1 and CFA Block_G2, and a blue CFA block CFA Block_B, respectively shown in (a) to (d) of FIG. 3, according to an implementation. FIG. 3 shows an example, in which each CFA block has a size of a*b in which "a" pixels are arranged in the width direction and "b" pixels are arranged in the length direction, and accordingly, a single CFA block includes a*b pixels.

According to an example embodiment, when a CFA cell is converted into a Bayer pattern by a remosaic process, a CFA block may include a plurality of pixels having an interpolation distance of 0 (or having the same color pattern as the Bayer pattern). For example, a unit including one or more pixels in a CFA block may be referred to as a sub block, and the CFA block may include a first sub block (e.g., an intra-sub block), which has a certain size and includes pixels arranged to have an interpolation distance of 0. The CFA block may further include one or more second sub blocks, each of which includes pixels arranged to have an interpolation distance of 0. The second sub block may form an inter-sub block together with other second sub blocks having an interpolation distance of 0 in other CFA blocks. The CFA block may also include a plurality of pixels (e.g., remaining pixels) besides the first and second sub blocks. According to an implementation, the remaining pixels may sense the same color. Some of the remaining pixels may have an interpolation distance of 0 according to the positions thereof, and the others of the remaining pixels may have a non-zero interpolation distance.

The red CFA block CFA Block_R in (a) of FIG. 3 may include a first sub block, including pixels having an interpolation distance of 0, and at least one second sub block. For example, when the red CFA block CFA Block_R is on the left top of a CFA cell, a second sub block in the right bottom corner of the red CFA block CFA Block_R may be an element of an inter-sub block of the CFA cell. In the red CFA block CFA Block_R, the remaining pixels excluding the first and second sub blocks may include red pixels R.

As shown in (a) of FIG. 3, sub blocks having an interpolation distance of 0 may be respectively arranged in the other three corners of the red CFA block CFA Block_R. In example embodiments, each of the sub blocks in the other three corners of the red CFA block CFA Block_R may form an inter-sub block together with sub blocks (e.g., sub blocks including pixels having an interpolation distance of 0) of CFA blocks of other CFA cells and thus be referred to as a second sub block. Each second sub block may include at least one pixel. For example, each second sub block may include various numbers of pixels, e.g., one pixel, 2*2 pixels, 3*3 pixels, etc.

Similarly, each of the first green CFA block CFA Block_G1 in (b) of FIG. 3 and the second green CFA block CFA Block_G2 in (c) of FIG. 3 may include an intra-sub block, i.e., a first sub block, and second sub blocks. The color patterns of the first sub block and the second sub blocks of the first green CFA block CFA Block_G1 may be the same as or different from the color patterns of the first sub block and the second sub blocks of the second green CFA block CFA Block_G2. In each of the first green CFA block CFA Block_G1 and the second green CFA block CFA Block_G2, the remaining pixels excluding the first and second sub blocks may include green pixels G.

As shown in (d) of FIG. 3, the blue CFA block CFA Block_B may include an intra-sub block and second sub blocks, and the remaining pixels of the blue CFA block CFA Block_B may include blue pixels B. An example of an intra-sub block having a size of c*d in each CFA block is shown in (e) of FIG. 3. The respective second sub blocks of the four CFA blocks described above may form an inter-sub block shown in (f) of FIG. 3.

A CFA cell may be formed by arranging the CFA blocks respectively shown in (a) to (d) of FIG. 3 as shown in FIG. 4. FIG. 4 shows the case where the red CFA block CFA Block_R is on the left top of the CFA cell, the first green CFA block CFA Block_G1 is on the right top of the CFA cell, the second green CFA block CFA Block_G2 is on the left bottom of the CFA cell, and the blue CFA block CFA Block_B is on the right bottom of the CFA cell.

When the CFA cell is formed using the CFA blocks in FIG. 3, an inter-sub block including respective second sub blocks of the CFA blocks may be in the central region of the CFA cell, as shown in FIG. 4. For example, when the second sub block of each CFA block includes a single pixel, the inter-sub block may have a size of 2*2. When the second sub block of each CFA block includes 2*2 pixels, the inter-sub block may have a size of 4*4. The inter-sub block may include all of a red pixel, a blue pixel, and a green pixel. For example, the pixels of the inter-sub block may have the same color pattern as pixels in corresponding positions in a Bayer pattern resulting from a remosaic process.

When the CFA cell is formed as shown in FIG. 4, at least one second sub block shown in FIG. 3 may be arranged in an outer region of the CFA cell. In example embodiments, a plurality of second sub blocks adjacent to each other in one CFA cell form an inter-sub block, but example embodiments are not limited thereto. For example, when a pixel array is formed, a plurality of CFA cells may be arranged in the length and width directions, and accordingly, a second sub block in the outer region of a CFA cell may form an inter-sub block together with second sub blocks of other CFA cells. In other words, although a unit including second sub blocks of a plurality of CFA blocks may be referred to as an inter-sub block in FIG. 4, a unit including second sub blocks of a plurality of CFA cells may also be referred to as an inter-sub block.

According to an example embodiment, the number of pixels having an interpolation distance of 0 in a CFA block may be increased, and accordingly, image loss during a remosaic process may be reduced. Because a plurality of pixels sensing the same color may be secured in a CFA block, the signals of a plurality of pixels of the CFA block may be added up in a binning mode, and accordingly, binning performance may be sufficiently secured.

Although FIG. 3 illustrates a second sub block is in each of all four corners of a CFA block, example embodiments are not limited thereto and a second sub block may be arranged in only one corner of a CFA block such that a single inter-sub block is formed in the central region of the CFA cell of FIG. 4. The red, blue, and green pixels applied to the pixel array 110 are provided as examples, and example embodiments are not limited thereto. For example, pixels involved in various filters such as a cyan filter and an RGBW filter may be applied to example embodiments, and example embodiments are not limited to patterns sensing particular colors.

Specific implementations of a pixel array of an image sensor according to example embodiments will be described below. Although one or more second sub blocks are arranged in a CFA block in example embodiments described below, the color pattern of a CFA cell according to example embodiments is not limited to the drawings.

Figure 5:
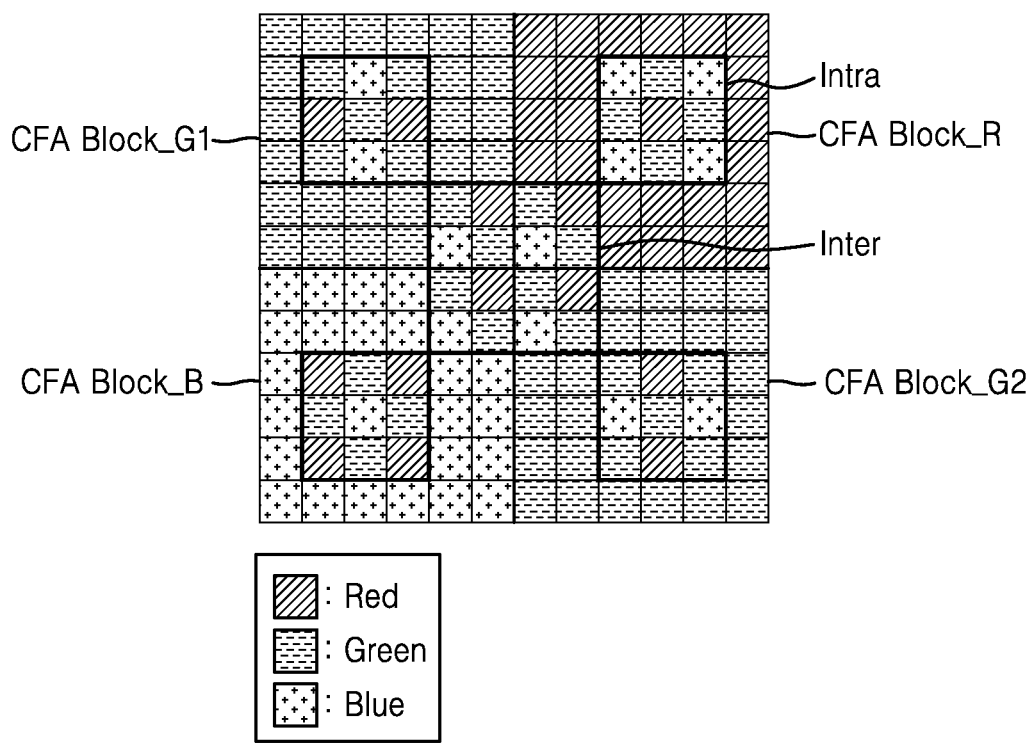
FIGS. 5 and 6 are diagrams illustrating a pixel array and a remosaiced color pattern, according to an example embodiment.
Figure 6:
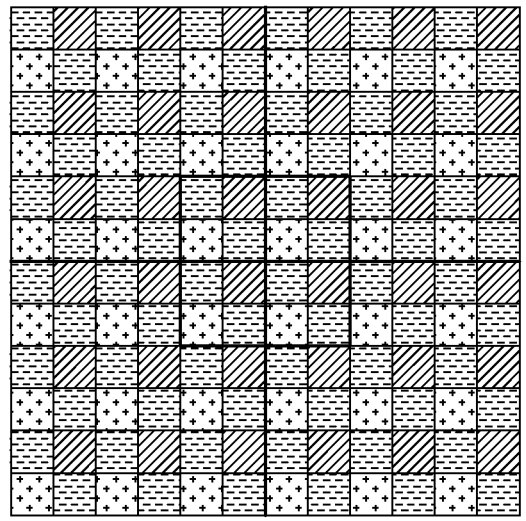

FIGS. 5 and 6 are diagrams illustrating a pixel array and a remosaiced color pattern, according to an example embodiment. Hereinafter, CFA blocks including 6*6 pixels are described, but the size of a CFA block may be variously set in example embodiments.

According to an implementation, a CFA cell includes four CFA blocks, and accordingly, the CFA cell may have a size of 12*12. The four CFA blocks may include the red CFA block CFA Block_R, the first green CFA block CFA Block_G1, the second green CFA block CFA Block_G2, and the blue CFA block CFA Block_B. When the pixel array described above includes red, green, and blue pixels, each CFA block may include all red, green, and blue pixels. Various types of CFA cells may be implemented based on the arrangement of four CFA blocks. For example, the CFA cell of FIG. 5 shows an example, in which green, red, blue, and green CFA blocks are sequentially on the left top, the right top, the left bottom, and the right bottom of the CFA cell.

The CFA cell having a size of 12*12 may be converted into a Bayer pattern of FIG. 6 by a remosaic process. Interpolation of red, green, and blue colors may be needed to remosaic the 12*12 CFA cell into the Bayer pattern. When interpolation of a green color is performed, relatively many adjacent green pixels may be selected and used for the interpolation because the green color includes more edge information of an image than a red or blue color. For example, a neighboring green pixel necessary for interpolation may be selected in each of four directions (e.g., a slash direction, a backslash direction, a horizontal direction, and a vertical direction), and the average of distances from a pixel (e.g., a center pixel), for which interpolation is calculated, to neighboring green pixels may be calculated as an interpolation distance of the center pixel. By contrast, when interpolation of a blue or red color is performed, at least one neighboring pixel may be selected regardless of a direction from a pixel, for which interpolation is calculated.

According to an example embodiment, the color pattern of pixels of an intra-sub block of a CFA cell may be the same as that of pixels in corresponding positions in a Bayer pattern. An inter-sub block may be arranged in the CFA cell, and the color pattern of pixels of the inter-sub block may be the same as that of pixels in corresponding positions in the Bayer pattern. Accordingly, a plurality of pixels having an interpolation distance of 0 may be secured in one CFA cell, and loss of image information may be prevented from increasing through reduction of the interpolation distance.

In an example embodiment, as shown in FIG. 5, the red CFA block CFA Block_R may include an intra-sub block having a size of 3*3 and a second sub block having a size of 2*2, which form an inter-sub block. When a CFA block includes a 2*2 second sub block, a CFA cell may include a 4*4 inter-sub block.

The remaining pixels, excluding the intra-sub block and the second sub block in the red CFA block CFA Block_R, may include red pixels. However, example embodiments are not limited thereto. While the number of red pixels is the highest in the remaining pixels of the red CFA block CFA Block_R, at least one of the remaining pixels may sense a different color than red.

Because the pixels of the intra-sub block and the pixels of the inter-sub block have the same color pattern as the Bayer pattern, the intra-sub block and the inter-sub block may each include all red, green, and blue pixels. Because the second sub block of each CFA block includes 2*2 pixels having the Bayer pattern, the four pixels of the second sub block may include one red pixel, two green pixels, and one blue pixel.

Although FIG. 5 shows the case where the respective second sub blocks of 2*2 CFA blocks are arranged to be adjacent to each other, thereby forming the 4*4 inter-sub block, example embodiments are not limited thereto. For example, each of the red CFA block CFA Block_R, the first green CFA block CFA Block_G1, the second green CFA block CFA Block_G2, and the blue CFA block CFA Block_B may be arranged in a different position in the CFA cell. In this case, the respective second sub blocks of four CFA blocks may be separated from each other in the CFA cell. In an example embodiment, an inter-sub block may include four second sub blocks separated from each other.

FIG. 7 is a diagram showing an example of an interpolation distance of each of color pixels included in a CFA cell of FIG. 5.

According to an example embodiment, when an interpolation distance of each of pixels to be remosaiced is calculated using the method described above, values shown in FIG. 7 may be obtained. For example, in the case of interpolation of a green color, two neighboring green pixels that are most adjacent to each other in each of four directions (e.g., the slash direction, the backslash direction, the horizontal direction, and the vertical direction) may be selected. In the case of interpolation of a red or blue color, two neighboring red or blue pixels that are most adjacent to each other regardless of directions may be selected.

As shown in FIG. 7, the interpolation distance of each of the pixels of the intra-sub block and inter-sub block of the CFA cell may be calculated as 0. In the case of the remaining pixels, distances to neighboring pixels to be referred to for interpolation may be reduced due to the color patterns shown in FIGS. 5 and 6. Accordingly, the overall average of interpolation distances calculated in the CFA cell may be minimized, and therefore, loss of image information may also be minimized.

Figure 8:
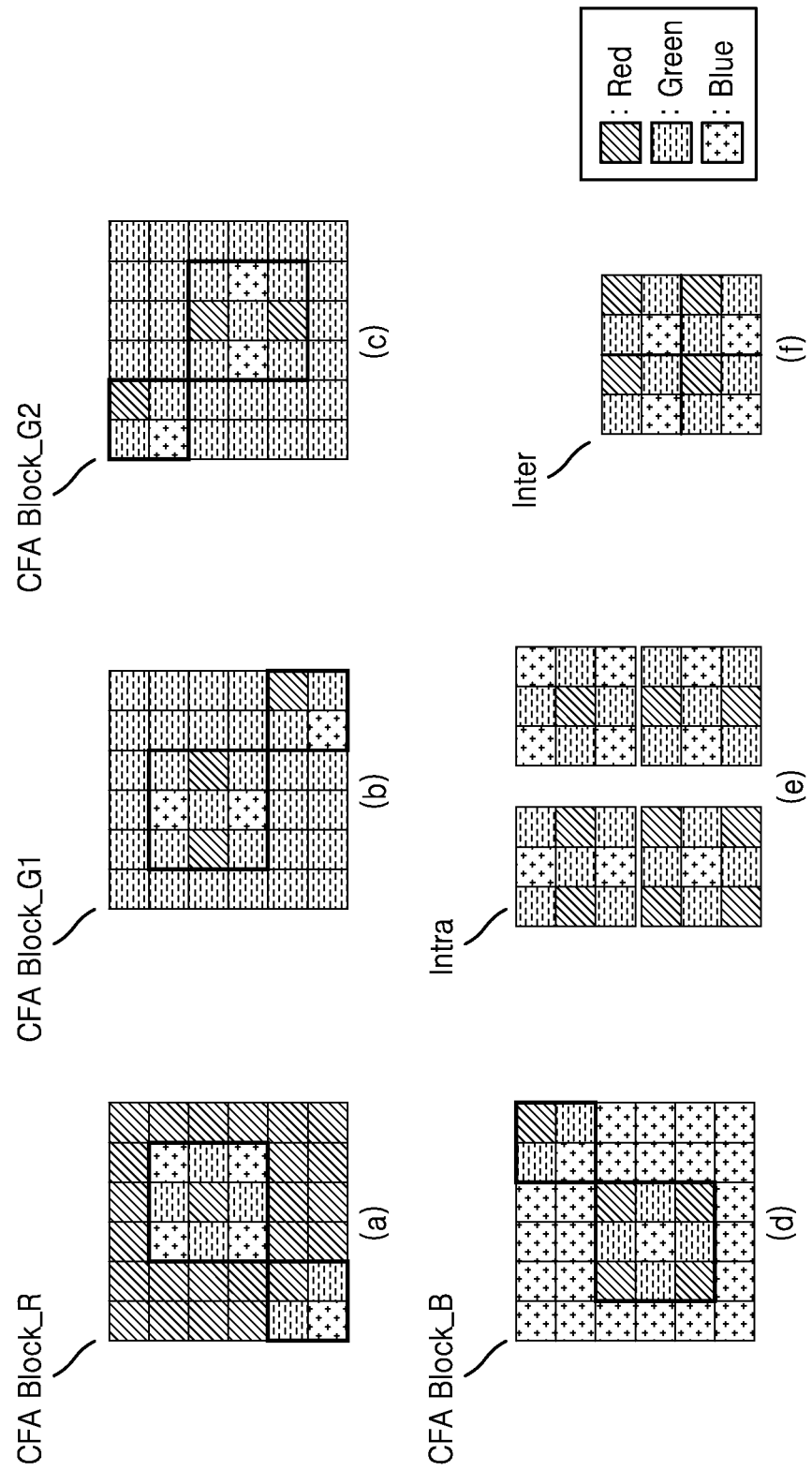
FIG. 8 is a diagram showing an example of the arrangement of pixels constituting the CFA cell of FIG. 5.

FIG. 8 is a diagram showing an example of the arrangement of pixels constituting the CFA cell of FIG. 5.

Referring to (a) to (d) of FIG. 8, the red CFA block CFA Block_R, the first green CFA block CFA Block_G1, the second green CFA block CFA Block_G2, and the blue CFA block CFA Block_B may each include an intra-sub block having a size of 3*3, and the pixels of the intra-sub block may have an interpolation distance of 0 and include red, green, and blue pixels. The red CFA block CFA Block_R, the first green CFA block CFA Block_G1, the second green CFA block CFA Block_G2, and the blue CFA block CFA Block_B may each include a second sub block forming an inter-sub block of the CFA cell. For example, the red CFA block CFA Block_R may include a 2*2 second sub block on the left bottom thereof, the first green CFA block CFA Block_G1 may include a 2*2 second sub block on the right bottom thereof, the second green CFA block CFA Block_G2 may include a 2*2 second sub block on the left top thereof, and the blue CFA block CFA Block_B may include a 2*2 second sub block on the right top thereof.

The respective intra-sub blocks of the red CFA block CFA Block_R, the first green CFA block CFA Block_G1, the second green CFA block CFA Block_G2, and the blue CFA block CFA Block_B are shown in (e) of FIG. 8. The inter-sub block of the CFA cell is shown in (f) of FIG. 8. When green, red, blue, and green CFA blocks are sequentially arranged on the left top, the right top, the left bottom, and the right bottom of a CFA cell, based on the CFA blocks in (a) to (d) of FIG. 8, the CFA cell of FIG. 5 may be obtained.

In an example embodiment, the respective intra-sub blocks of the red CFA block CFA Block_R, the first green CFA block CFA Block_G1, the second green CFA block CFA Block_G2, and the blue CFA block CFA Block_B may have different color patterns from each other. By contrast, the respective second sub blocks of the red CFA block CFA Block_R, the first green CFA block CFA Block_G1, the second green CFA block CFA Block_G2, and the blue CFA block CFA Block_B may have the same color pattern as each other. However, in example embodiments, the respective intra-sub blocks of CFA blocks may have the same color pattern as each other and the respective second sub blocks of the CFA blocks may have different color patterns from each other, according to the sizes of a CFA cell and the CFA blocks and the positions of the intra-sub block and the second sub block in each CFA block.

Figure 9A:
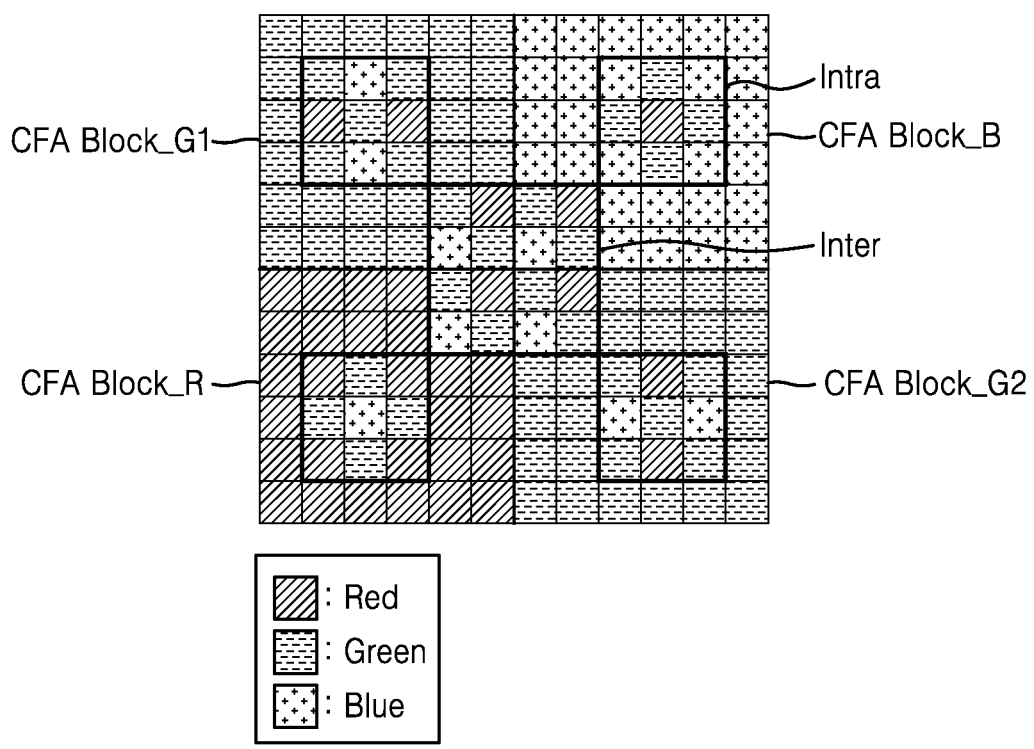
FIGS. 9A, 9B and 9C are diagrams showing various implementations of CFA cells including a 3*3 intra-sub block and a 4*4 inter-sub block.
Figure 9B:
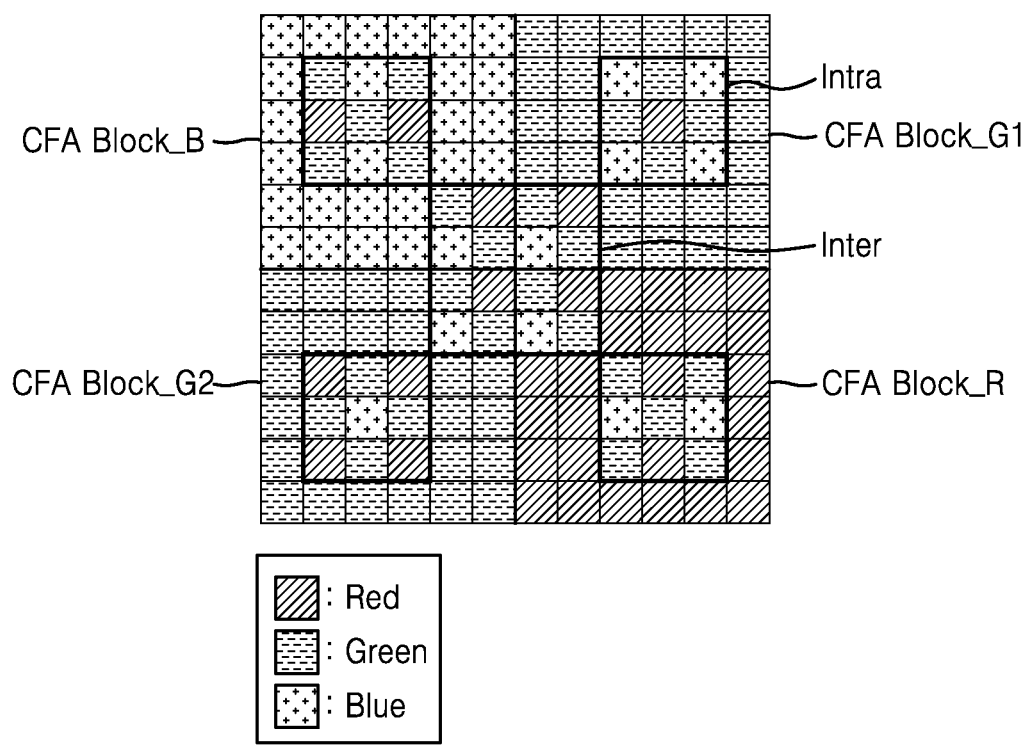
Figure 9C:
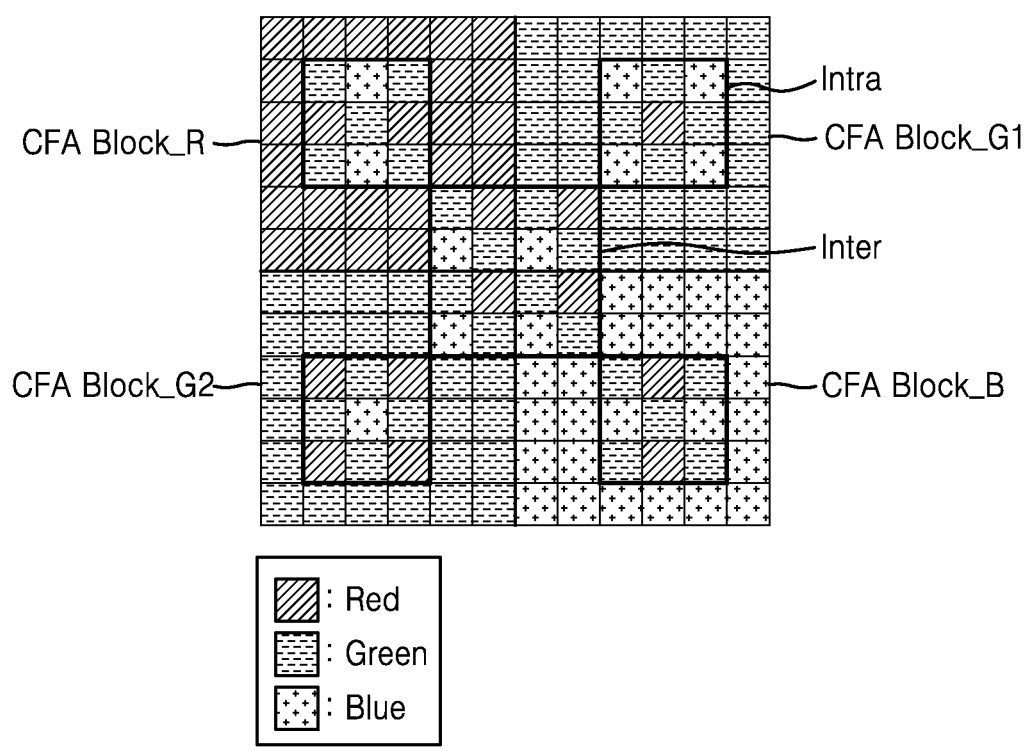

FIGS. 9A to 9C are diagrams showing various implementations of CFA cells including a 3*3 intra-sub block and a 4*4 inter-sub block.

FIG. 9A shows the case where green, blue, red, and green CFA blocks are sequentially arranged on the left top, the right top, the left bottom, and the right bottom of a CFA cell. A 4*4 inter-sub block may be in a central region of the CFA cell. At this time, the blue CFA block CFA Block_B may include a 2*2 second sub block on the left bottom thereof, and the red CFA block CFA Block_R may include a 2*2 second sub block on the right top thereof. The first green CFA block CFA Block_G1 may include a 2*2 second sub block on the right bottom thereof, and the second green CFA block CFA Block_G2 may include a 2*2 second sub block on the left top thereof.

FIG. 9B shows the case where blue, green, green, and red CFA blocks are sequentially arranged on the left top, the right top, the left bottom, and the right bottom of a CFA cell. A 4*4 inter-sub block may be in a central region of the CFA cell. At this time, the blue CFA block CFA Block_B may include a 2*2 second sub block on the right bottom thereof, and the red CFA block CFA Block_R may include a 2*2 second sub block on the left top thereof. The first green CFA block CFA Block_G1 may include a 2*2 second sub block on the left bottom thereof, and the second green CFA block CFA Block_G2 may include a 2*2 second sub block on the right top thereof.

FIG. 9C shows the case where red, green, green, and blue CFA blocks are sequentially arranged on the left top, the right top, the left bottom, and the right bottom of a CFA cell. A 4*4 inter-sub block may be in a central region of the CFA cell. At this time, the red CFA block CFA Block_R may include a 2*2 second sub block on the right bottom thereof, and the blue CFA block CFA Block_B may include a 2*2 second sub block on the left top thereof. The first green CFA block CFA Block_G1 may include a 2*2 second sub block on the left bottom thereof, and the second green CFA block CFA Block_G2 may include a 2*2 second sub block on the right top thereof.

Hereinafter, examples of various kinds of color filter arrays that may be implemented according to example embodiments will be described. Example embodiments are not limited to the specific examples of color filter arrays described below, and the specific arrangement of pixels of a color filter array may be partially modified as long as the effects are provided.

Figure 11A:
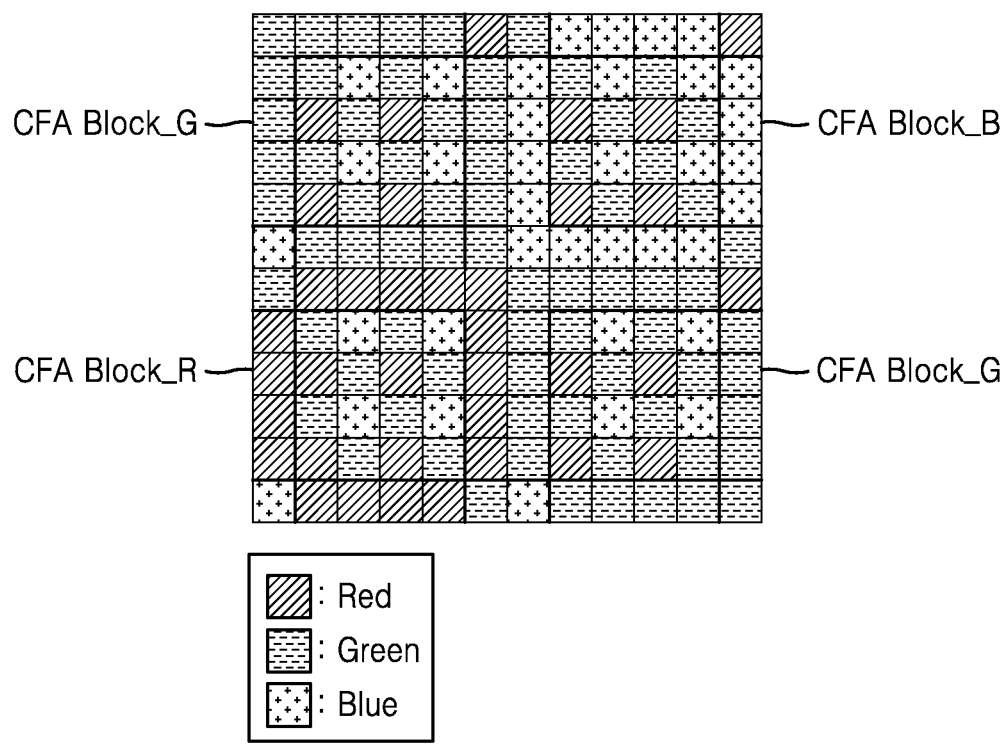
Figure 11B:
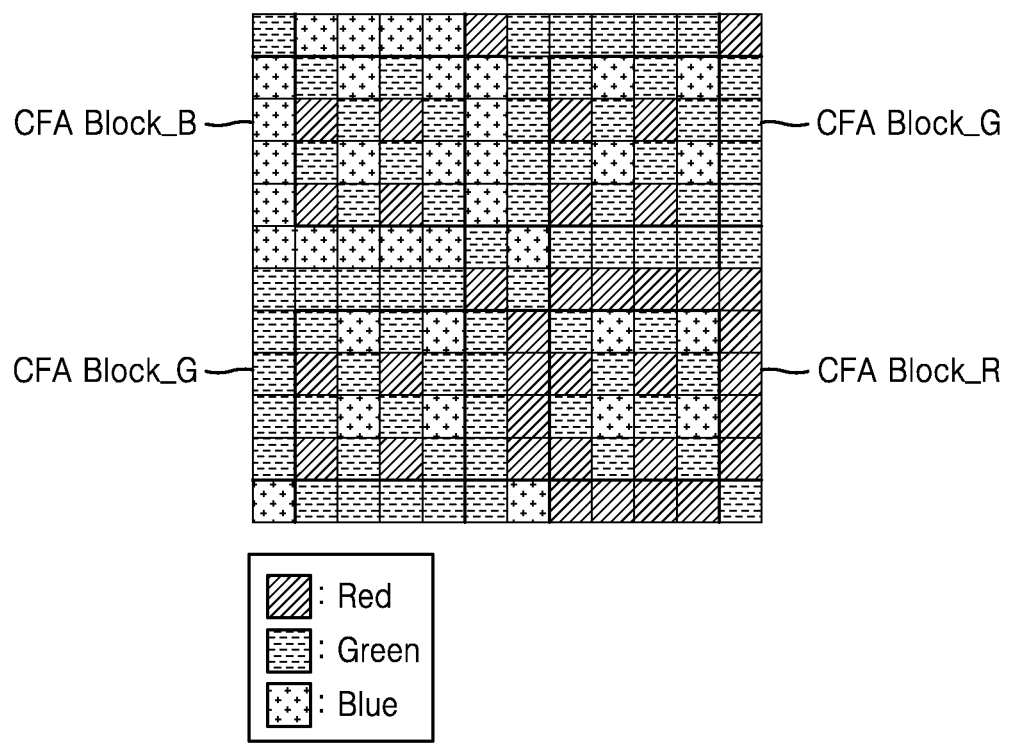
Figure 11C:
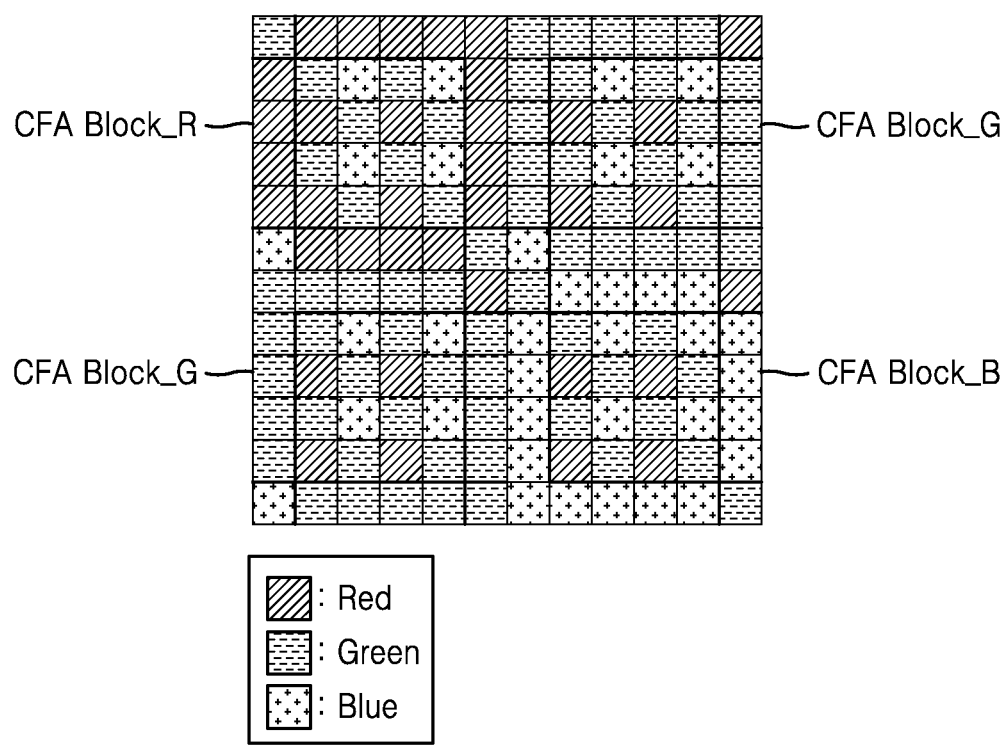

FIGS. 10 to 11C are diagrams showing implementations of a CFA cell according to various example embodiments. FIGS. 10 to 11C show the case where a CFA cell includes 2*2 CFA blocks and each CFA block has a size of 6*6. The sizes of an intra-sub block and an inter-sub block of each of the CFA cells of FIGS. 10 to 11C are different from those of each of the CFA cells of FIGS. 5 and 9A to 9C.

Referring to FIG. 10, (a) of FIG. 10 illustrates an implementation of the red CFA block CFA Block_R, (b) of FIG. 10 illustrates an implementation of a green CFA block CFA Block_G, and (c) of FIG. 10 illustrates an implementation of the blue CFA block CFA Block_B. A first sub block (or an intra-sub block) having a size of 4*4 may be in a central region of each CFA block, and a second sub block including at least one pixel having an interpolation distance of 0 may be in an outer region of each CFA block. As shown in (a), (b), and (c) of FIG. 10, at least one pixel sensing a different color than a main color may also be in the outer region of each CFA block. For example, in the case of the red CFA block CFA Block_R in (a) of FIG. 10, while a majority number of red pixels are arranged in the outer region, a blue pixel is arranged in the second sub block and two green pixels are respectively arranged in two corners of the red CFA block CFA Block_R.

Referring to (a) to (c) of FIG. 10, the red CFA block CFA Block_R, the green CFA block CFA Block_G, and the blue CFA block CFA Block_B may each include an intra-sub block having a size of 4*4 and including red, green, and blue pixels, each of which may have an interpolation distance of 0. Pixels may be arranged in the outer region of each of the red CFA block CFA Block_R, the green CFA block CFA Block_G, and the blue CFA block CFA Block_B such that an inter-sub block is implemented according to example embodiments. FIG. 10 shows the case where green pixels are consecutively arranged in a diagonal direction in each CFA block, and red and blue pixels are alternately arranged in another diagonal direction in each CFA block.

The pixels of the intra-sub block of each CFA block are shown in (d) of FIG. 10, and a CFA cell implemented by the CFA blocks in (a) to (c) of FIG. 10 is shown in (f) of FIG. 10. According to an example embodiment, the CFA cell shown in (f) of FIG. 10 may include the inter-sub block shown in (e) of FIG. 10. In other words, when the CFA cell shown in (f) of FIG. 10 is converted into a Bayer pattern by a remosaic process, for example as shown in (g) of FIG. 10, the pixels of the intra-sub block and the inter-sub block of the CFA cell may have an interpolation distance of 0, and accordingly, image loss caused by the remosaic process may be reduced.

FIGS. 11A to 11C show CFA cells implemented by variously changing the positions of the CFA blocks shown in (a), (b), and (c) of FIG. 10 in a CFA cell. For example, FIG. 11A shows the case where green CFA blocks CFA Block_G are respectively on the left top and right bottom of a CFA cell, the blue CFA block CFA Block_B is on the right top of the CFA cell, and the red CFA block CFA Block_R is on the left bottom of the CFA cell. FIG. 11B shows the case where green CFA blocks CFA Block_G are respectively on the right top and left bottom of a CFA cell, the blue CFA block CFA Block_B is on the left top of the CFA cell, and the red CFA block CFA Block_R is on the right bottom of the CFA cell. FIG. 11C shows the case where green CFA blocks CFA Block_G are respectively on the right top and left bottom of a CFA cell, the blue CFA block CFA Block_B is on the right bottom of the CFA cell, and the red CFA block CFA Block_R is on the left top of the CFA cell.

As shown in FIGS. 11A to 11C, the number of pixels having an interpolation distance of 0 may be increased compared to FIG. 5 and FIGS. 9A to 9C, and accordingly, the interpolation distance may be reduced during a remosaic process, and image loss may also be reduced. According to example embodiments, for example as shown in FIGS. 11A to 11C, an inter-sub block having a certain size may be implemented in the central region of a CFA cell, according to the color arrangement of pixels in the outer region of each CFA block, regardless of the positions of the red CFA block CFA Block_R, the green CFA block CFA Block_G, and the blue CFA block CFA Block_B in the CFA cell.

Figure 12:
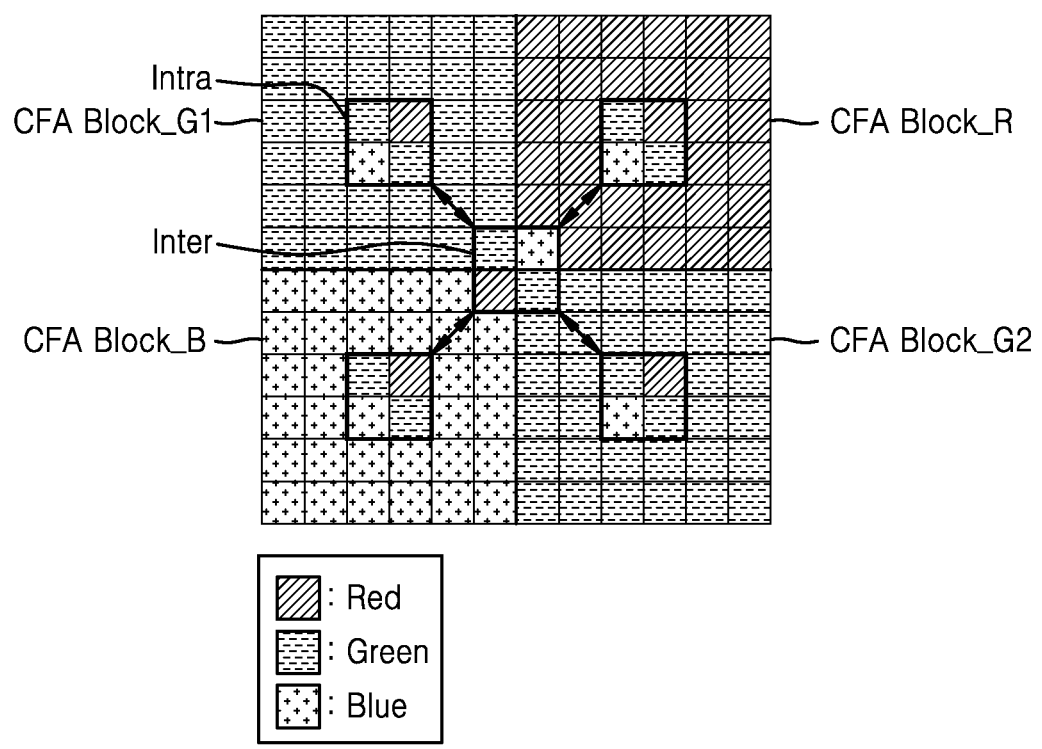
FIG. 12 is a diagram showing an implementation of a CFA cell according to various example embodiments.

FIG. 12 is a diagram showing an implementation of a CFA cell according to various example embodiments. FIG. 12 shows the case where an intra-sub block and an inter-sub block are spaced apart from each other in a CFA cell.

As described above, remosaic performance and binning performance may be variously controlled by the size of an intra-sub block and the size of an inter-sub block. FIG. 12 shows the case where at least one of the intra-sub block and the inter-sub block is decreased such that the intra-sub block and the inter-sub block are spaced apart from each other, and accordingly, binning performance is increased.

In the case of FIG. 12, the first green CFA block CFA Block_G1 is on the left top of the CFA cell, the red CFA block CFA Block_R is on the right top of the CFA cell, the blue CFA block CFA Block_B is on the left bottom of the CFA cell, the second green CFA block CFA Block_G2 is on the right bottom of the CFA cell, and in one CFA block, an intra-sub block has a size of 2*2 and a second sub block forming an inter-sub block includes one pixel. Accordingly, the inter-sub block of the CFA cell may include 2*2 pixels. In addition, the intra-sub block has a same pattern as the Bayer pattern and may thus include two green pixels, one red pixel, and one blue pixel. Green pixels respectively in the first and second green CFA blocks CFA Block_G1 and CFA Block_G2, a blue pixel in the red CFA block CFA Block_R, and a red pixel in the blue CFA block CFA Block_B may form the inter-sub block of the CFA cell.

Implementations of CFA cells having various sizes, according to example embodiments, are described below. Although FIGS. 13 to 16 each show an example in which a CFA block of a CFA cell has a size of 2*2, 3*3, 4*4, or 5*5, the CFA block may have a size of 6*6 or greater according to example embodiments.

Referring to FIG. 13, a CFA cell may include four CFA block, each having a size of 2*2, and thus have a size of 4*4. For example, each of two CFA cells in FIG. 13 may include only an inter-sub block. In an example embodiment consistent with (a) of FIG. 13, a green pixel on the right bottom of the first green CFA block CFA Block_G1, a blue pixel on the left bottom of the red CFA block CFA Block_R, a red pixel on the right top of the blue CFA block CFA Block_B, and a green pixel on the left top of the second green CFA block CFA Block_G2 may form the inter-sub block a CFA cell.

When the CFA cell is formed as shown in (a) of FIG. 13, the first green CFA block CFA Block_G1 and the second green CFA block CFA Block_G2 may include only green pixels. By contrast, the red CFA block CFA Block_R may include one blue pixel, and the blue CFA block CFA Block_B may include one red pixel.

In an example embodiment consistent with (b) of FIG. 13, a blue pixel on the left bottom of the first green CFA block CFA Block_G1, a green pixel on the right bottom of the red CFA block CFA Block_R, a green pixel on the left top of the blue CFA block CFA Block_B, and a red pixel on the right top of the second green CFA block CFA Block_G2 may form the inter-sub block a CFA cell. When the CFA cell is formed as shown in (b) of FIG. 13, each CFA block may include pixels sensing two different colors, and the inter-sub block of the CFA cell may include pixels apart from each other.

Referring to FIG. 14, a CFA cell may include four CFA block, each having a size of 3*3, and thus have a size of 6*6. For example, a CFA cell in an example embodiment consistent with (a) of FIG. 14 may include only an inter-sub block, and a CFA cell in an example embodiment consistent with (b) of FIG. 14 may include only an intra-sub block.

When the CFA cell is formed as shown in (a) of FIG. 14, 2*2 pixels on the right bottom of the first green CFA block CFA Block_G1, 2*2 pixels on the left bottom of the red CFA block CFA Block_R, 2*2 pixels on the right top of the blue CFA block CFA Block_B, and 2*2 pixels on the right bottom of the second green CFA block CFA Block_G2 may form the inter-sub block of the CFA cell. Accordingly, the CFA cell may include the inter-sub block having a size of 4*4. As shown in (a) of FIG. 14, the respective second sub blocks (or the four groups of 2*2 pixels) of all CFA blocks of the CFA cell may have the same color pattern as each other.

As shown in (b) of FIG. 14 only some CFA blocks of the CFA cell may include an intra-sub block. When the CFA cell is formed as shown in (b) of FIG. 14, an intra-sub block having a size of 2*2 may be arranged in each of the red CFA block CFA Block_R and the blue CFA block CFA Block_B. In an example embodiment, the intra-sub block of the red CFA block CFA Block_R may have the same color pattern as the intra-sub block of the blue CFA block CFA Block_B.

As shown in (b) of FIG. 14, the first green CFA block CFA Block_G1 and the second green CFA block CFA Block_G2 may include only green pixels, and accordingly, the number of green pixels may be increased in the CFA cell. Because a green color includes more edge information of an image than a red or blue color, when the number of green pixels secured for interpolation increases, remosaic performance may be enhanced. In other words, when green CFA blocks each include pixels sensing a green color and green pixels are arranged in a first or second sub block of each of red and blue CFA blocks, the number of green pixels in a CFA cell is increased, and accordingly, image quality may be enhanced in the case of interpolation and binning performance for a green CFA block may also be enhanced.

Referring to FIG. 15, a CFA cell may include four CFA block, each having a size of 4*4, and thus have a size of 8*8. For example, as shown in (a) of FIG. 15, a CFA cell may include only an intra-sub block, and as shown in (b) of FIG. 15, a CFA cell may include both an intra-sub block and an inter-sub block.

In the CFA cell in (a) of FIG. 15, the red CFA block CFA Block_R, the first green CFA block CFA Block_G1, the second green CFA block CFA Block_G2, and the blue CFA block CFA Block_B may each include an intra-sub block having a size of 2*2. The intra-sub block may include all red, green, and blue pixels. In an example embodiment, the respective intra-sub blocks of the red CFA block CFA Block_R, the first green CFA block CFA Block_G1, the second green CFA block CFA Block_G2, and the blue CFA block CFA Block_B may have the same color pattern as one another.

As shown in (b) of FIG. 15, a second sub block may include at least one pixel arranged in a region excluding the intra-sub block in each CFA block. For example, only green pixels may be arranged in a region (hereinafter, referred to as an outer region) excluding the intra-sub block in each of the first and second green CFA blocks CFA Block_G1 and CFA Block_G2, and one of the green pixels may correspond to the second sub block. One blue pixel may be arranged in the outer region of the red CFA block CFA Block_R, and one red pixel may be arrange in the outer region of the blue CFA block CFA Block_B.

Referring to FIG. 16, a CFA cell may include four CFA block, each having a size of 5*5, and thus have a size of 10*10. For example, as shown in (a) of FIG. 16, a CFA cell may include only an intra-sub block, and as shown in (b) of FIG. 16, a CFA cell may include only an inter-sub block.

In the CFA cell in (a) of FIG. 16, the red CFA block CFA Block_R, the first green CFA block CFA Block_G1, the second green CFA block CFA Block_G2, and the blue CFA block CFA Block_B may each include an intra-sub block having a size of 3*3. The intra-sub block may include all red, green, and blue pixels. In an example embodiment, the respective intra-sub blocks of the red CFA block CFA Block_R, the first green CFA block CFA Block_G1, the second green CFA block CFA Block_G2, and the blue CFA block CFA Block_B may have different color patterns from one another.

As shown in (b) of FIG. 16, each CFA block may include two types of second sub blocks. For example, two types of second sub blocks may each have a size of 2*2. For example, 2*2 pixels on the right bottom of the first green CFA block CFA Block_G1, 2*2 pixels on the left bottom of the red CFA block CFA Block_R, 2*2 pixels on the right top of the blue CFA block CFA Block_B, and 2*2 pixels on the left top of the second green CFA block CFA Block_G2 may form a type of an inter-sub block having a size of 4*4 in a central region of a CFA cell. In addition, 2*2 pixels on the left top of the first green CFA block CFA Block_G1 may form another type of an inter-sub block together with pixels of at least one adjacent CFA cell. Similarly, 2*2 pixels on the right top of the red CFA block CFA Block_R may form another type of an inter-sub block together with pixels of at least one adjacent CFA cell, 2*2 pixels on the left bottom of the blue CFA block CFA Block_B may form another type of an inter-sub block together with pixels of at least one adjacent CFA cell, and 2*2 pixels on the right bottom of the second green CFA block CFA Block_G2 may form another type of an inter-sub block together with pixels of at least one adjacent CFA cell.

FIGS. 13 to 16 show some examples that may be implemented, and example embodiments which may be variously modified. For example, the size of a CFA cell and the size of a CFA block may be variously implemented. Each CFA block may include at least two sub blocks each including pixels having an interpolation distance of 0. Various types of CFA cells may be implemented such that a sub block of a CFA block may be adjacent to a sub block of another CFA block to form an inter-sub block. In addition, the arrangement of color pixels of a sub block may vary with a color pixel arrangement in a remosaiced Bayer pattern.

Figure 17A:
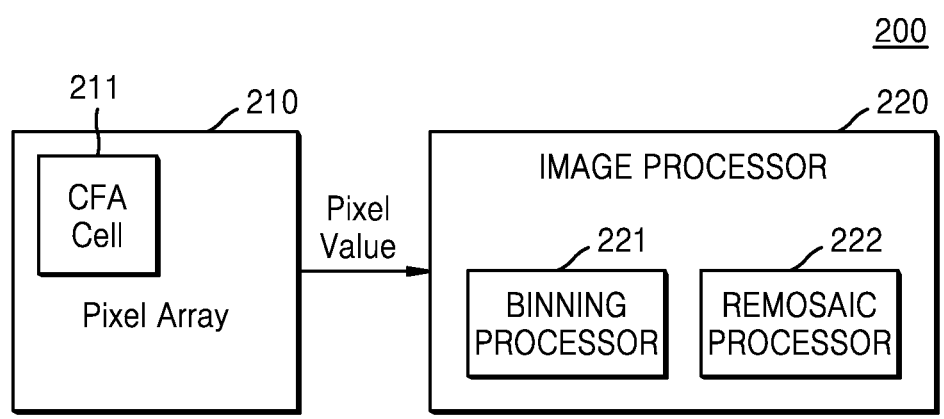
FIGS. 17A and 17B are block diagrams showing an example of an image processing unit including an image sensor, according to an example embodiment.
Figure 17B:
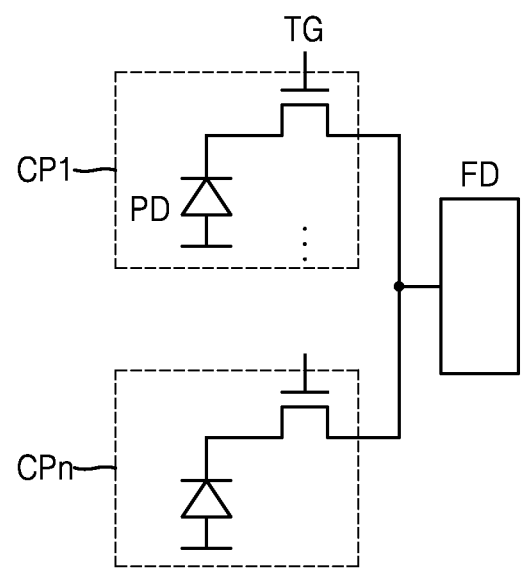

FIGS. 17A and 17B are block diagrams showing an example of an image processing unit including an image sensor, according to an example embodiment.

Referring to FIG. 17A, an image processing unit 200 may include a pixel array 210, which includes a CFA cell 211, and an image processor 220 (e.g., a hardware image processor), which performs image processing using pixel values from the pixel array 210. According to an example embodiment, the image sensor described above may include the pixel array 210 and at least some of configurations of the image processor 220. For example, the image sensor may include a configuration for a binning process and/or a configuration for a remosaic process.

The pixel array 210 may include CFA cells 211 having various patterns as discussed above with reference to FIGS. 1 to 16, and pixel values of pixels arranged in the pixel array 210 may be provided to the image processor 220. The image processor 220 may include various kinds of logic circuits, which process pixel values to generate image data. For example, the image processor 220 may include a binning processor 221 and a remosaic processor 222. Under the control of the binning processor 221, image processing may be performed using pixel values having relatively high resolution when a high-definition mode is selected or using pixel values having relatively low resolution when a low-definition mode is selected. The remosaic processor 222 may perform interpolation of a pixel in relation with a remosaic process. Pixel values corresponding to a Bayer pattern may be generated using pixel values of CFA cells, according to example embodiments described above.

According to an example embodiment, the pixel array 210 may include the CFA cells (or the CFA blocks) described in the above example embodiments, and a binning process may be performed by the image processor 220 based on the arrangement of pixels, which has been described above. As a result of performing the binning process, the amount of image data processed by the image processor 220 may be reduced, and data throughput per frame may also be reduced, so that a high frame rate may be maintained in a video mode.

According to an example embodiment, the binning process may be performed based on various methods. For example, the binning process may be performed based on a method, in which the image processor 220 performs digital addition of pixel values from pixels of the pixel array 210. Alternatively, the binning process may be performed based on a method, in which electrical signals of at least two pixels of the pixel array 210 are added up in an analog fashion.

In the binning process, pixels, of which the signals are added up, may be variously selected. For example, when pixels are selected together, pixels sensing the same color in one CFA block may be selected, and signals of the pixels may be added up in an analog or a digital fashion. For example, all or some of pixels sensing the same color in one CFA block may be selected.

For another binning method, the image processor 220 may be configured such that pixels sensing the same color in at least two CFA blocks are selected and signals of the pixels are added up in an analog or a digital fashion. For example, signals of pixels sensing a same color in one CFA block and in at least one row or column of an adjacent CFA block may be added up.

FIG. 17B is a diagram showing an example of performing a binning process by adding analog signals.

Referring to FIG. 17B, a pixel array may include a plurality of pixels, and "n" pixels CP1 through CPn may share one floating diffusion region FD with each other. For example, at least some of pixels, which sense the same color in one CFA block, may share the floating diffusion region FD with each other. According to an implementation, all or some of pixels, which sense the same color in a CFA block, may share the floating diffusion region FD with each other.

Each pixel may include circuitry, including a photodiode PD and a transfer gate TG. For example, when transfer gates TG of the respective "n" pixels CP1 through CPn are all turned on, the photocharge of the "n" pixels CP1 through CPn may be simultaneously provided to the floating diffusion region FD. When the transfer gates TG of the respective "n" pixels CP1 through CPn are individually controlled, the photocharges of the "n" pixels CP1 through CPn may be provided to the floating diffusion region FD at different timings. For example, when a binning mode is not executed, the photocharge of the "n" pixels CP1 through CPn is provided to the floating diffusion region FD at different timings. When the binning mode is executed, the photocharge of the "n" pixels CP1 through CPn is simultaneously provided to the floating diffusion region FD such that signals of the "n" pixels CP1 through CPn may be added up in the floating diffusion region FD.

In an example embodiment, a CFA block may include all red, green, and blue pixels. In a CFA block for a certain color, the number of pixels sensing the certain color may be the highest. For example, a red CFA block may include a majority number of red pixels, and the photocharge of at least some of the red pixels may be simultaneously provided to the floating diffusion region FD in a binning mode.

Figure 18:
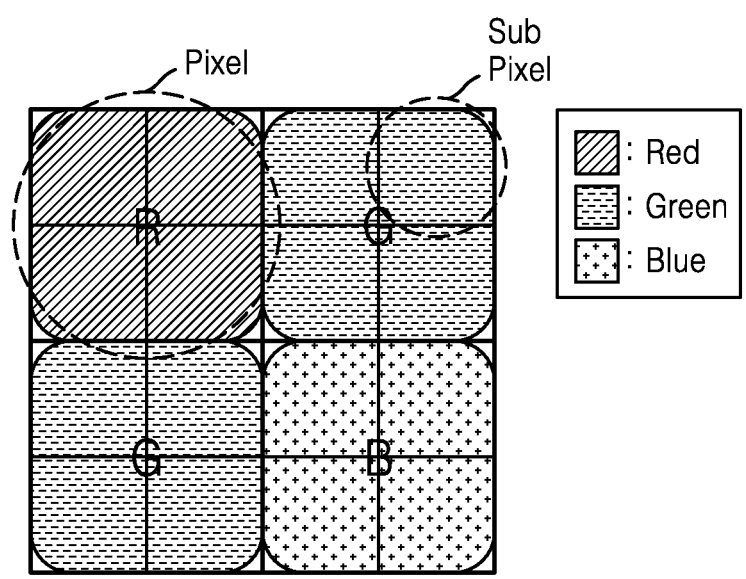
FIG. 18 is a diagram showing an implementation of a color pixel according to an example embodiment.

FIG. 18 is a diagram showing an implementation of a color pixel according to an example embodiment.

As described above, a pixel may include a corresponding color filter and a photosensitive element (e.g., a photodiode) sensing light (or color).

According to an implementation, a pixel may include a plurality of sub pixels. FIG. 18 illustrates an example, in which a pixel includes 2*2 sub pixels, but example embodiments are not limited thereto and a pixel may include more sub pixels. The photosensitive element is provided for each sub pixel, and accordingly, a plurality of photosensitive elements may be provided for a pixel. An image sensor may include a plurality of microlenses, and a microlens may be provided for each pixel or each sub pixel.

When a pixel signal corresponding to a pixel is calculated, at least some of signals generated by a plurality of sub pixels may be used. For example, assuming that a pixel on the left top of FIG. 18 is a red pixel and a plurality of sub pixels sense a red color, a pixel signal of the red pixel may be generated by a process using at least some of signals generated by the sub pixels.

Example embodiments may be variously realized. For example, a pixel may provide signals resulting from sensing at least two colors. For example, color filters sensing different colors may be arranged for a plurality of sub pixels of a pixel, and the pixel may be variously implemented as long as an interpolation distance may be reduced, as described above.

Figure 19:
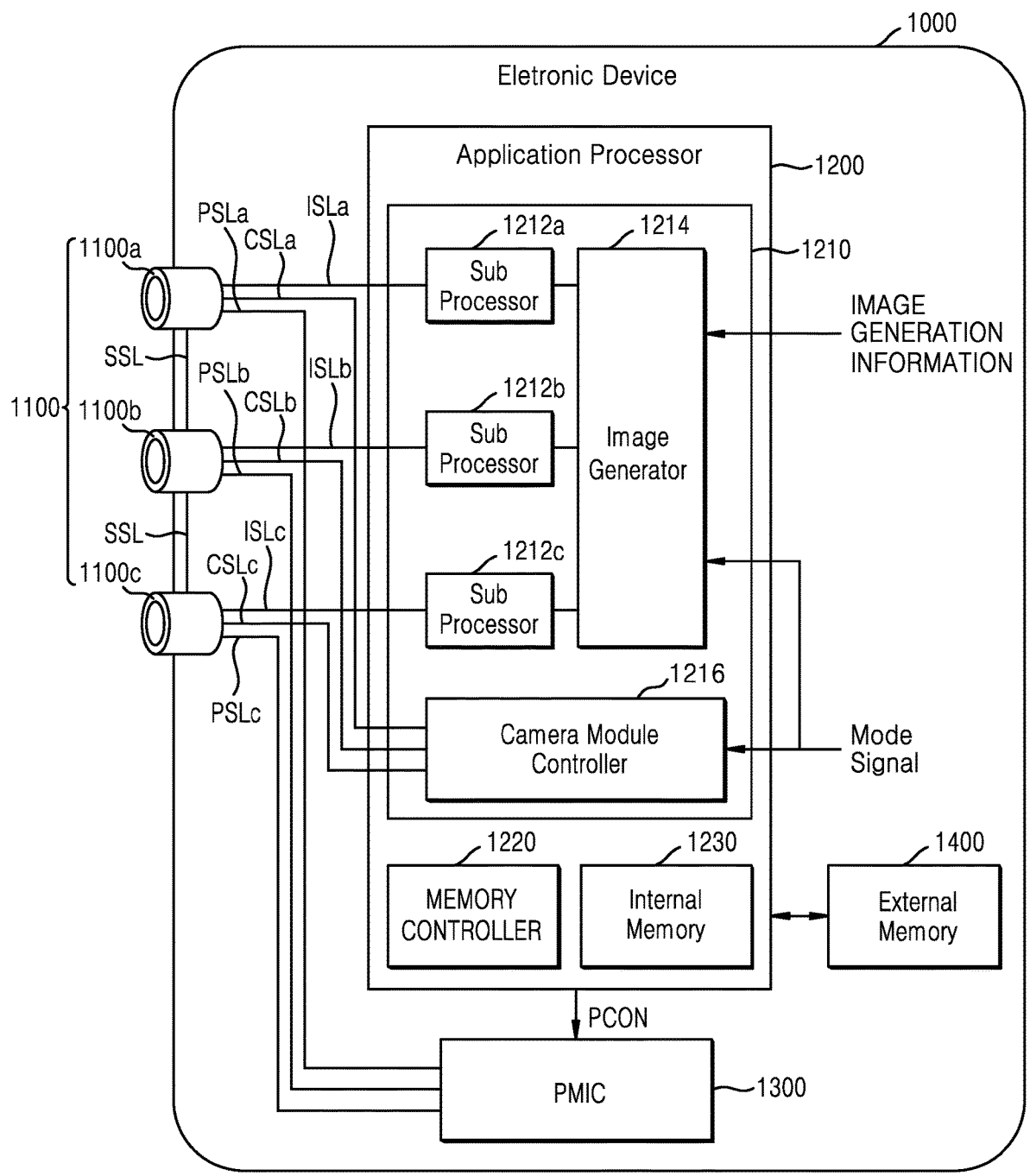
FIGS. 19 and 20 are block diagrams of an electronic device including a multi-camera module using an image sensor, according to an example embodiment.
Figure 20:
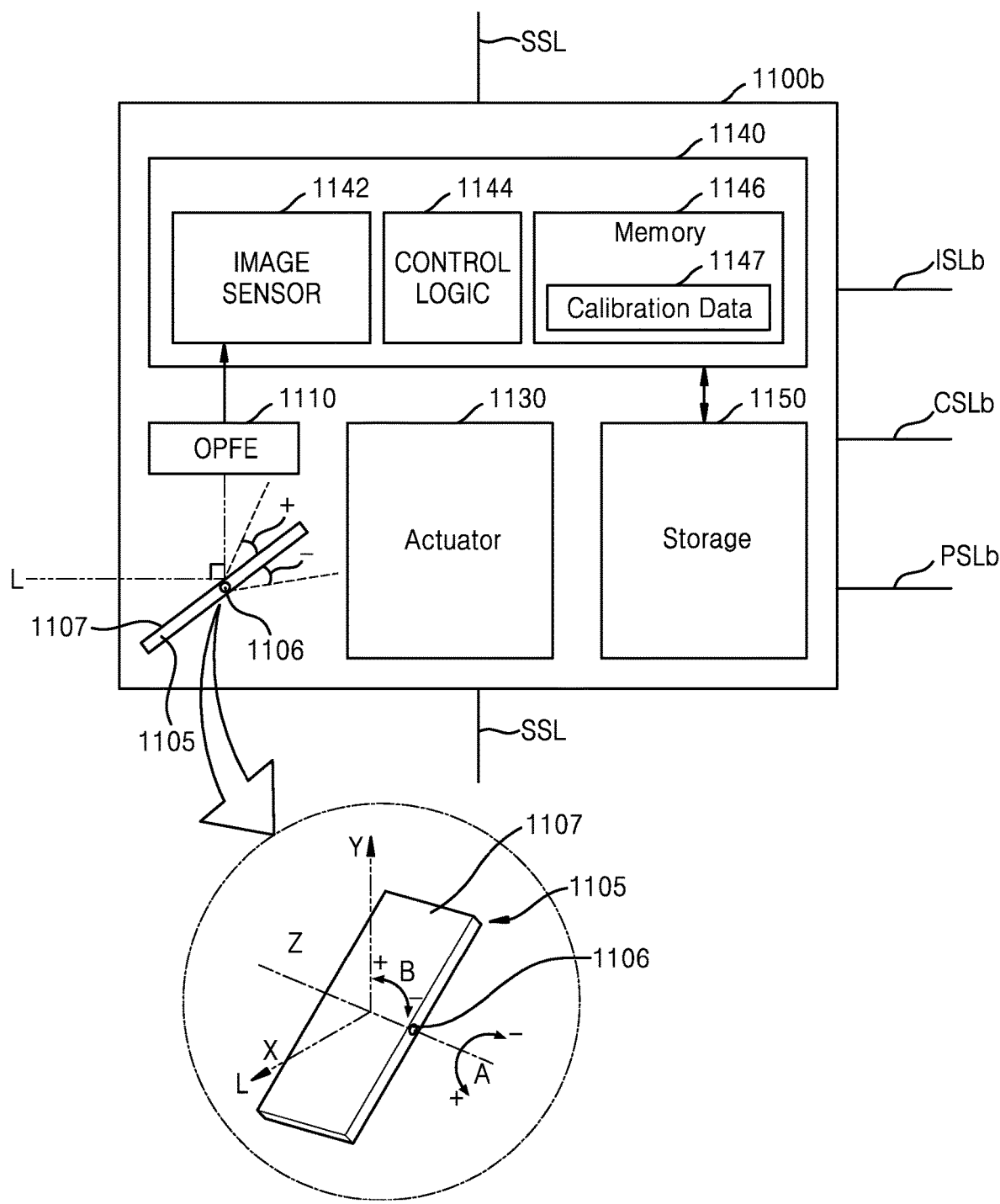

FIG. 19 is a block diagram of an electronic device including a multi-camera module using an image sensor, according to an example embodiment. FIG. 20 is a detailed block diagram of a camera module in FIG. 19.

Referring to FIG. 19, an electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. Although three camera modules 1100a, 1100b, and 1100c are illustrated in FIG. 19, example embodiments are not limited thereto. In some example embodiments, the camera module group 1100 may be modified to include only two camera modules. In some example embodiments, the camera module group 1100 may be modified to include "n" camera modules, where "n" is a natural number of at least 4.

The detailed configuration of the camera module 1100b will be described with reference to FIG. 20 below. The descriptions below may also applied to the other camera modules 1100a and 1100c.

Referring to FIG. 20, the camera module 1100b may include a prism 1105, an optical path folding element (OPFE) 1110, an actuator 1130, an image sensing device 1140, and a storage 1150.

The prism 1105 may include a reflective surface 1107 of a light reflecting material and may change the path of light L incident from outside.

In some example embodiments, the prism 1105 may change the path of the light L incident in a first direction X into a second direction Y perpendicular to the first direction X. The prism 1105 may rotate the reflective surface 1107 of the light reflecting material in a direction A around a central shaft 1106 or rotate the central shaft 1106 in a direction B so that the path of the light L incident in the first direction X is changed into the second direction Y perpendicular to the first direction X. At this time, the OPFE 1110 may move in a third direction Z, which is perpendicular to the first and second directions X and Y.

In some example embodiments, an A-direction maximum rotation angle of the prism 1105 may be less than or equal to 15 degrees in a plus (+) A direction and greater than 15 degrees in a minus (—) A direction, but example embodiments are not limited thereto.

In some example embodiment, the prism 1105 may move by an angle of about 20 degrees or in a range from about 10 degrees to about 20 degrees or from about 15 degrees to about 20 degrees in a plus or minus B direction. At this time, an angle by which the prism 1105 moves in the plus B direction may be the same as or similar, within a difference of about 1 degree, to an angle by which the prism 1105 moves in the minus B direction.

In some example embodiments, the prism 1105 may move the reflective surface 1107 of the light reflecting material in the third direction Z parallel with an extension direction of the central shaft 1106.

The OPFE 1110 may include, for example, "m" optical lenses, where "m" is a natural number. The "m" lenses may move in the second direction Y and change an optical zoom ratio of the camera module 1100b. For example, when the default optical zoom ratio of the camera module 1100b is Z, the optical zoom ratio of the camera module 1100b may be changed to 3Z, 5Z, or greater by moving the "m" optical lenses included in the OPFE 1110.

The actuator 1130 may move the OPFE 1110 or an optical lens to a certain position. For example, the actuator 1130 may adjust the position of the optical lens such that an image sensor 1142 is positioned at a focal length of the optical lens for accurate sensing.

The image sensing device 1140 may include the image sensor 1142, a control logic 1144, and a memory 1146. The image sensor 1142 may sense an image of an object using the light L provided through the optical lens. According to the example embodiment described above, the image sensor 1142 may include a pixel array, and a color pattern of a plurality of pixels of the pixel array may follow the patterns of a CFA cell, a CFA block, and a sub block as described above.

The control logic 1144 may generally control operations of the camera module 1100b. For example, the control logic 1144 may control operation of the camera module 1100b according to a control signal provided through a control signal line CSLb.

The memory 1146 may store information, such as calibration data 1147, necessary for the operation of the camera module 1100b. The calibration data 1147 may include information, which is necessary for the camera module 1100b to generate image data using the light L provided from outside. For example, the calibration data 1147 may include information about the degree of rotation described above, information about a focal length, information about an optical axis, or the like. When the camera module 1100b is implemented as a multi-state camera that has a focal length varying with the position of the optical lens, the calibration data 1147 may include a value of a focal length for each position (or state) of the optical lens and information about auto focusing.

The storage 1150 may store image data sensed by the image sensor 1142. The storage 1150 may be provided outside the image sensing device 1140 and may form a stack with a sensor chip of the image sensing device 1140. In some example embodiments, the storage 1150 may include electrically erasable programmable read-only memory (EEPROM), but example embodiments are not limited thereto.

In some example embodiments, each of the camera modules 1100a, 1100b, and 1100c may include the actuator 1130. Accordingly, the camera modules 1100a, 1100b, and 1100c may include the calibration data 1147, which is the same or different among the camera modules 1100a, 1100b, and 1100c according to the operation of the actuator 1130 included in each of the camera modules 1100a, 1100b, and 1100c.

In some example embodiments, one (e.g., the camera module 1100b) of the camera modules 1100a, 1100b, and 1100c may be of a folded-lens type including the prism 1105 and the OPFE 1110 while the other camera modules (e.g., the camera modules 1100a and 1100c) may be of a vertical type that does not include the prism 1105 and the OPFE 1110. However, example embodiments are not limited thereto.

In some example embodiments, one (e.g., the camera module 1100c) of the camera modules 1100a, 1100b, and 1100c may include a vertical depth camera, which extracts depth information using an infrared ray (IR). In this case, the application processor 1200 may generate a three-dimensional (3D) depth image by merging image data provided from the depth camera with image data provided from another camera module (e.g., the camera module 1100a or 1100b).

In some example embodiments, at least two camera modules (e.g., 1100a and 1100b) among the camera modules 1100a, 1100b, and 1100c may have different field-of-views. In this case, the two camera modules (e.g., 1100a and 1100b) among the camera modules 1100a, 1100b, and 1100c may respectively have different optical lenses, but example embodiments are not limited thereto.

In some example embodiments, the camera modules 1100a, 1100b, and 1100c may have different field-of-views from one another. In this case, the camera modules 1100a, 1100b, and 1100c may respectively have different optical lenses, but example embodiments are not limited thereto.

In some example embodiments, the camera modules 1100a, 1100b, and 1100c may be physically separated from one another. In other words, the sensing area of the image sensor 1142 is not divided and used by the camera modules 1100a, 1100b, and 1100c, but the image sensor 1142 may be independently included in each of the camera modules 1100a, 1100b, and 1100c.

Referring back to FIG. 19, the application processor 1200 may include an image processing unit 1210, a memory controller 1220, and an internal memory 1230. The application processor 1200 may be separately implemented from the camera modules 1100a, 1100b, and 1100c. For example, the application processor 1200 and the camera modules 1100a, 1100b, and 1100c may be implemented in different semiconductor chips.

The image processing unit 1210 may include a plurality of sub processors 1212a, 1212b, and 1212c, an image generator 1214, and a camera module controller 1216.

The image processing unit 1210 may include as many sub processors 1212a, 1212b, and 1212c as the camera modules 1100a, 1100b, and 1100c.

Image data generated from each camera module 1100a, 1100b, or 1100c may be provided to a corresponding one of the sub processors 1212a, 1212b, and 1212c through a corresponding one of separate image signal lines ISLa, ISLb, and ISLc. For example, image data generated from the camera module 1100a may be provided to the sub processor 1212a through the image signal line ISLa, image data generated from the camera module 1100b may be provided to the sub processor 1212b through the image signal line ISLb, and image data generated from the camera module 1100c may be provided to the sub processor 1212c through the image signal line ISLc. Such image data transmission may be performed using, for example, a mobile industry processor interface (MIPI) based camera serial interface (CSI), but example embodiments are not limited thereto.

In some example embodiments, a single sub processor may be provided for a plurality of camera modules. For example, differently from FIG. 19, the sub processors 1212a and 1212c may not be separated but may be integrated into a single sub processor, and the image data provided from the camera module 1100a or the camera module 1100c may be selected by a selection element (e.g., a multiplexer) and then provided to the integrated sub processor.

The image data provided to each of the sub processors 1212a, 1212b, and 1212c may be provided to the image generator 1214. The image generator 1214 may generate an output image using the image data provided from each of the sub processors 1212a, 1212b, and 1212c according to image generation information or a mode signal.

In detail, the image generator 1214 may generate the output image by merging at least portions of respective pieces of image data, which are respectively generated from the camera modules 1100a, 1100b, and 1100c having different field-of-views, according to the image generation information or the mode signal. Alternatively, the image generator 1214 may generate the output image by selecting one of pieces of image data, which are respectively generated from the camera modules 1100a, 1100b, and 1100c having different field-of-views, according to the image generation information or the mode signal.

In some example embodiments, the image generation information may include a zoom signal or a zoom factor. In some example embodiments, the mode signal may be based on a mode selected by a user.

When the image generation information includes a zoom signal or a zoom factor and the camera modules 1100a, 1100b, and 1100c have different field-of-views, the image generator 1214 may perform different operations according to different kinds of zoom signals. For example, when the zoom signal is a first signal, the image generator 1214 may merge image data output from the camera module 1100a with image data output from the camera module 1100c and then generate an output image using a merged image signal and image data output from the camera module 1100b, which has not been used in the merging. When the zoom signal is a second signal different from the first signal, the image generator 1214 may not perform this image data merging but select one of pieces of image data respectively output from the camera modules 1100a through 1100c to generate an output image. However, example embodiments are not limited thereto, and a method of processing image data may be changed whenever necessary.

In some example embodiments, the image generator 1214 may receive a plurality of pieces of image data, which have different exposure times, from at least one of the sub processors 1212a, 1212b, and 1212c and perform high dynamic range (HDR) processing on the pieces of image data, thereby generating merged image data having an increased dynamic range.

The camera module controller 1216 may provide a control signal to each of the camera modules 1100a, 1100b, and 1100c. A control signal generated by the camera module controller 1216 may be provided to a corresponding one of the camera modules 1100a, 1100b, and 1100c through a corresponding one of control signal lines CSLa, CSLb, and CSLc, which are separated from one another.

One (e.g., the camera module 1100b) of the camera modules 1100a, 1100b, and 1100c may be designated as a master camera according to the mode signal or the image generation signal including a zoom signal, and the other camera modules (e.g., 1100a and 1100c) may be designated as slave cameras. Such designation information may be included in a control signal and provided to each of the camera modules 1100a, 1100b, and 1100c through a corresponding one of the control signal lines CSLa, CSLb, and CSLc, which are separated from one another.

A camera module operating as a master or a slave may be changed according to a zoom factor or an operation mode signal. For example, when the field-of-view of the camera module 1100a is greater than that of the camera module 1100b and the zoom factor indicates a low zoom ratio, the camera module 1100b may operate as a master and the camera module 1100a may operate as a slave. By contrast, when the zoom factor indicates a high zoom ratio, the camera module 1100a may operate as a master and the camera module 1100b may operate as a slave.

In some example embodiments, a control signal provided from the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit the sync enable signal to the camera module 1100b. The camera module 1100b provided with the sync enable signal may generate a sync signal based on the sync enable signal and may provide the sync signal to the camera modules 1100a and 1100c through a sync signal line SSL. The camera modules 1100a, 1100b, and 1100c may be synchronized with the sync signal and may transmit image data to the application processor 1200.

In some example embodiments, a control signal provided from the camera module controller 1216 to each of the camera modules 1100a, 1100b, and 1100c may include mode information according to the mode signal. The camera modules 1100a, 1100b, and 1100c may operate in a first operation mode or a second operation mode in relation with a sensing speed based on the mode information.

In the first operation mode, the camera modules 1100a, 1100b, and 1100c may generate an image signal at a first speed (e.g., at a first frame rate), encode the image signal at a second speed higher than the first speed (e.g., at a second frame rate higher than the first frame rate), and transmit an encoded image signal to the application processor 1200. At this time, the second speed may be at most 30 times the first speed.

The application processor 1200 may store the received image signal, i.e., the encoded image signal, in the internal memory 1230 therein or the external memory 1400 outside the application processor 1200. Thereafter, the application processor 1200 may read the encoded image signal from the internal memory 1230 or the external memory 1400, decode the encoded image signal, and display image data generated based on a decoded image signal. For example, a corresponding one of the sub processors 1212a, 1212b, and 1212c of the image processing unit 1210 may perform the decoding and may also perform image processing on the decoded image signal.

In the second operation mode, the camera modules 1100a, 1100b, and 1100c may generate an image signal at a third speed lower than the first speed (e.g., at a third frame rate lower than the first frame rate) and transmit the image signal to the application processor 1200. The image signal provided to the application processor 1200 may not have been encoded. The application processor 1200 may perform image processing on the image signal or store the image signal in the internal memory 1230 or the external memory 1400.

The PMIC 1300 may provide power, e.g., a power supply voltage, to each of the camera modules 1100a, 1100b, and 1100c. For example, under the control of the application processor 1200, the PMIC 1300 may provide first power to the camera module 1100a through a power signal line PSLa, second power to the camera module 1100b through a power signal line PSLb, and third power to the camera module 1100c through a power signal line PSLc.

The PMIC 1300 may generate power corresponding to each of the camera modules 1100a, 1100b, and 1100c and adjust the level of the power, in response to a power control signal PCON from the application processor 1200. The power control signal PCON may include a power adjustment signal for each operation mode of the camera modules 1100a, 1100b, and 1100c. For example, the operation mode may include a low-power mode. At this time, the power control signal PCON may include information about a camera module to operate in the low-power mode and a power level to be set. The same or different levels of power may be respectively provided to the camera modules 1100a, 1100b, and 1100c. The level of power may be dynamically changed.

At least one of the components, elements, modules or units represented by a block as illustrated in FIGS. 1, 17A, 19 and 20 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of example embodiments have been particularly shown and described, it will be understood that various changes in form and details may be made therein without departing from the spirit and scope of the following claims.

What is claimed is:

1. A pixel array of an image sensor, the pixel array comprising:
    a plurality of color filter array (CFA) cells, each of the plurality of CFA cells comprising a plurality of CFA blocks provided along a width direction and a length direction,
    wherein each of the plurality of CFA blocks comprises a first sub block and a second sub block, the first sub block comprises m*n pixels having an interpolation distance of 0 during conversion into a Bayer pattern, and the second sub block comprises at least one pixel having the interpolation distance of 0 during conversion into the Bayer pattern among pixels outside the first sub block, where "m" and "n" are integers of at least 2,
    wherein the m*n pixels of the first sub block comprise pixels corresponding to a first color, a second color and a third color, and wherein respective second sub blocks of the plurality of CFA blocks form an inter-sub block in each of the plurality of CFA cells.

2. The pixel array of claim 1, wherein the first color comprises a red color, the second color comprises a green color, and the third color comprises a blue color.

3. The pixel array of claim 1, wherein respective second sub blocks of the plurality of CFA blocks are adjacent to one another in a central region of each of the plurality of CFA cells, and
wherein the inter-sub block comprises a*b pixels, where "a" and "b" are integers of at least 2.

4. The pixel array of claim 1, wherein each of the plurality of CFA cells comprises 2*2 CFA blocks provided along the width direction and the length direction, the 2*2 CFA blocks comprises a red CFA block, a first green CFA block, a second green CFA block, and a blue CFA block,
wherein each of the 2*2 CFA blocks comprises 6*6 pixels,
wherein the first sub block of each of the 2*2 CFA blocks comprises a*a pixels provided in a center region of each of the 2*2 CFA blocks, and
wherein the second sub block of each of the 2*2 CFA blocks comprises b=b pixels provided in at least one corner of each of the 2*2 CFA blocks, where "a" is an integer of at least 2 and "b" is an integer of at least 1.

5. The pixel array of claim 4, wherein the first sub block comprises 4*4 pixels, the second sub block comprises one pixel in the at least one corner of each of the 2*2 CFA blocks, and
the inter-sub block comprises 2*2 pixels.

6. The pixel array of claim 5, wherein a blue pixel provided in a corner of the red CFA block, a green pixel provided in a corner of each of the first green CFA block and the second green CFA block, and a red pixel provided in a corner of the blue CFA block form the inter-sub block.

7. The pixel array of claim 4, wherein the first sub block comprises 3*3 pixels, the second sub block comprises 2*2 pixels provided in the at least one corner of each of the 2*2 CFA blocks, and
the inter-sub block comprises 4*4 pixels.

8. The pixel array of claim 1, wherein each of the plurality of CFA cells comprises 2*2 CFA blocks provided along the width direction and the length direction, the 2*2 CFA blocks comprise a red CFA block, a first green CFA block, a second green CFA block, and a blue CFA block, and
wherein each of the 2*2 CFA blocks comprises 5*5 pixels, the first sub block of each of the 2*2 CFA blocks comprises a*a pixels provided in a center region of each of the 2*2 CFA blocks, and the second sub block of each of the 2*2 CFA blocks comprises b=b pixels provided in at least one corner of each of the 2*2 CFA blocks, where "a" is an integer of at least 2 and "b" is an integer of at least 1.

9. The pixel array of claim 1, wherein a binning process is performed on pixels of the pixel array, and
wherein signals of pixels corresponding to a same color in one of the plurality of CFA blocks are selectively added up during the binning process.

10. A pixel array of an image sensor, the pixel array comprising:
a plurality of color filter array (CFA) cells, each of the plurality of CFA cells comprising 2*2 CFA blocks provided along a width direction and a length direction,
wherein each of the 2*2 CFA blocks comprises an intra-sub block and an outer region, the intra-sub block being provided at a central region of each of the 2*2 CFA blocks and comprising a first plurality of pixels having an interpolation distance of 0 during a conversion into a Bayer pattern, and the outer region being outside of the intra-sub block and comprising a second plurality of pixels,
wherein the 2*2 CFA blocks comprise a red CFA block, a first green CFA block, a second green CFA block, and a blue CFA block, the intra-sub block of each of the 2*2 CFA blocks comprises a red pixel, a blue pixel, and a green pixel, in a color pattern corresponding to the Bayer pattern, and
wherein red pixels and a sub block are arranged in the outer region of the red CFA block, the red pixels sensing a red color, and the sub block comprises any one or any combination of the green pixel and the blue pixel, each having the interpolation distance of 0.

11. The pixel array of claim 10, wherein blue pixels and a sub block are arranged in the outer region of the blue CFA block, the blue pixels sensing a blue color, and the sub block comprising at least one selected from the green pixel and the red pixel each having the interpolation distance of 0.

12. The pixel array of claim 11, wherein the sub block comprises one pixel,
wherein the red CFA block comprises the blue pixel as the sub block, and the blue CFA block comprises the red pixel as the sub block, and
wherein 2*2 pixels form an inter-sub block in a central region of each of the plurality of CFA cells, the 2*2 pixels comprise the sub block of the red CFA block, the sub block of the blue CFA block, and a green pixel in the outer region of each of the first green CFA block and the second green CFA block, the green pixel having the interpolation distance of 0.

13. The pixel array of claim 11, wherein the red pixel and the blue pixel, each having the interpolation distance of 0, are respectively arranged in the respective outer regions of the first green CFA block and the second green CFA block.

14. The pixel array of claim 11, wherein the sub block having a size of 2*2 is arranged in the outer region of each of the red CFA block, the first green CFA block, the second green CFA block, and the blue CFA block, and
wherein the sub block comprises one red pixel, two green pixels, and one blue pixel, each having the interpolation distance of 0.

15. The pixel array of claim 14, wherein the sub block of the red CFA block, the sub block of the first green CFA block, the sub block of the second green CFA block, and the sub block of the blue CFA block are adjacent to one another in a central region of each of the plurality of CFA cells, and comprise 4*4 pixels which form an inter-sub block.

16. The pixel array of claim 11, wherein each of the 2*2 CFA blocks comprises 6*6 pixels,
wherein the intra-sub block comprises 3*3 pixels, and
wherein the sub block of each of the red CFA block and the blue CFA block comprises 2*2 pixels comprising one red pixel, two green pixels, and one blue pixel, in a color pattern corresponding to the Bayer pattern.

17. The pixel array of claim 11, wherein each of the 2*2 CFA blocks comprises 6*6 pixels, the intra-sub block comprises 4*4 pixels,
wherein the sub block of the red CFA block comprises one blue pixel having the interpolation distance of 0, and
wherein the sub block of the blue CFA block comprises one red pixel having the interpolation distance of 0.

18. An image sensor comprising:
a pixel array comprising a plurality of color filter array (CFA) cells, each comprising a plurality of CFA blocks provided along a width direction and a length direction, each of the plurality of CFA blocks comprising a first sub block and a second sub block, the first sub block comprising m*n pixels having an interpolation distance of 0 during conversion into a Bayer pattern, and the second sub block comprising at least one pixel having the interpolation distance of 0 during the conversion into the Bayer pattern among pixels outside the first sub block, where "m" and "n" are integers of at least 2; and a read circuit configured to read pixel values from pixels of the pixel array, wherein the m*n pixels of the first sub block comprise pixels corresponding to a first color, a second color and a third color, and respective second sub blocks of the plurality of CFA blocks form an inter-sub block in each of the plurality of CFA cells.

19. The image sensor of claim 18, wherein respective second sub blocks of the plurality of CFA blocks are adjacent to one another in a central region of each of the plurality of CFA cells, and wherein the inter-sub block comprises a*b pixels, where "a" and "b" are integers of at least 2.

20. The image sensor of claim 18, further comprising a binning processor configured to perform a binning process based on pixel values read from the pixel array, wherein signals of pixels corresponding to a same color in one of the plurality of CFA blocks are summed during the binning process.

\* \* \* \* \*